United States Patent
Ishii

(10) Patent No.: US 10,820,258 B2
(45) Date of Patent: *Oct. 27, 2020

(54) USER EQUIPMENT, BASE STATION APPARATUS, COMMUNICATION METHOD OF A USER EQUIPMENT AND COMMUNICATION METHOD OF A BASE STATION APPARATUS

(71) Applicants: Sharp Kabushiki Kaisha, Sakai, Osaka (JP); FG Innovation Company Limited, Tuen Mun, New Territories, Hong Kong (CN)

(72) Inventor: Atsushi Ishii, Vancouver, WA (US)

(73) Assignees: SHARP KABUSHIKI KAISHA, Sakai, Osaka (JP); FG Innovation Company Limited, Tuen Mun (HK)

(*) Notice: Subject to any disclaimer, the term of this patent is extended or adjusted under 35 U.S.C. 154(b) by 0 days.

This patent is subject to a terminal disclaimer.

(21) Appl. No.: 16/433,844

(22) Filed: Jun. 6, 2019

(65) Prior Publication Data

US 2019/0289529 A1 Sep. 19, 2019

Related U.S. Application Data

(63) Continuation of application No. 15/659,027, filed on Jul. 25, 2017, now Pat. No. 10,341,941.

(60) Provisional application No. 62/367,590, filed on Jul. 27, 2016.

(51) Int. Cl.
*H04W 48/10* (2009.01)
*H04W 48/12* (2009.01)

(52) U.S. Cl.
CPC ........... *H04W 48/10* (2013.01); *H04W 48/12* (2013.01)

(58) Field of Classification Search
CPC .............................. H04W 48/10; H04W 48/12
See application file for complete search history.

(56) References Cited

U.S. PATENT DOCUMENTS

| | | | |
|---|---|---|---|
| 8,538,444 B2 | 9/2013 | Lee et al. | |
| 2008/0261574 A1 | 10/2008 | Rinta-Aho et al. | |
| 2009/0262693 A1 | 10/2009 | Wang et al. | |
| 2011/0320856 A1* | 12/2011 | Deivasigamani | ..... H04L 1/0053 714/2 |
| 2013/0115872 A1 | 5/2013 | Huang et al. | |
| 2013/0258938 A1 | 10/2013 | Sågfors et al. | |
| 2015/0223148 A1 | 8/2015 | Shi et al. | |
| 2015/0382284 A1* | 12/2015 | Brismar | .............. H04W 28/085 370/329 |

(Continued)

FOREIGN PATENT DOCUMENTS

| EP | 2 816 741 A2 | 12/2014 |
|---|---|---|
| WO | WO 2008/044664 A1 | 4/2008 |

OTHER PUBLICATIONS

International Search Report and Written Opinion dated Oct. 5, 2017 in PCT Application No. PCT/US17/43649.

(Continued)

*Primary Examiner* — Wayne H Cai
(74) *Attorney, Agent, or Firm* — ScienBiziP, P.C.

(57) ABSTRACT

Method and apparatus use a value tag in conjunction with transmission and/or processing of system information in a wireless communication network, especially in conjunction with second type system information or non-essentially type system information.

14 Claims, 21 Drawing Sheets

(56) References Cited

U.S. PATENT DOCUMENTS

2016/0234759 A1 8/2016 Kubota
2016/0330677 A1 11/2016 Wu
2017/0279522 A1* 9/2017 Yi ................... H04W 56/0015

OTHER PUBLICATIONS

International Preliminary Report on Patentability dated Jan. 28, 2019 in PCT Application No. PCT/US17/43649.
R2-163853, 3GPP TSG-RAN WG2 Meeting #94, ETRI, "System information handling in NR", Nanjing, China, May 23-27, 2016.
R2-163743, 3GPP TSG-RAN WG2 Meeting #94, ZTE, "Consideration on the System Information in NR", Nanjing, P.R. China, May 23-27, 2016.
R2-163586, 3GPP TSG-RAN WG2 Meeting #94, Intel Corporation, "System information for standalone NR deployment", Nanjing, China, May 23-27, 2016.
R2-163470, 3GPP TSG RAN WG2 Meeting #94, CATT, "System information in NR", Nanjing, China, May 23-27, 2016.
R2-163371, 3GPP TSG-RAN WG2 Meeting #94, Samsung, "System Information Signalling Design in NR", Nanjing, China, May 23-27, 2016.
R2-164127, 3GPP TSG-RAN2 Meeting #94, Huawei, HiSilicon, "System information design", Nanjing, China, May 23-27, 2016.
R2-164122, 3GPP TSG-RAN WG2 Meeting #94, Qualcomm Incorporated, Convida Wireless, "NR System Information Provisioning", Nanjing, China May 23-27, 2016.
Tdoc R2-164088, 3GPP TSG-RAN WG2 #94, InterDigital Communications, "System Information Acquisition for New Radio Access", Nanjing, China, May 23-27, 2016.
R2-164078, 3GPP TSG-RAN WG2 #94 R2-164078, LG Electronics Inc., "Observations about on-demand SI delivery mechanism", Nanjing, China, May 23-27, 2016.
R2-164067, 3GPP TSG-RAN WG2 Meeting #94, Convida Wireless, "NR System Information Aspects", Nanjing, China, May 23-27, 2016.
Tdoc R2-164006, 3GPP TSG-RAN WG2 #94, Ericsson, "Requirements for System Information distribution", Nanjing, P.R. China, May 23-27, 2016.
Tdoc R2-163997, 3GPP TSG-RAN WG2 #94, Ericsson, "Solution principles for system information distribution", Nanjing, P.R. China, May 23-27, 2016.
R2-163980, 3GPP TSG RAN WG2 Meeting #94, NEC, "System information on demand in standalone NR", Nanjing, China, May 23-27, 2016.
R2-163977, 3GPP TSG RAN WG2 Meeting #94, Sony, "System Information Enhancements for NR", Nanjing, China, May 23-27, 2016.
R2-163975, 3GPP TSG-RAN WG2 #94, NTT DOCOMO, INC., "System Information design for standalone NR operation", Nanjing, China, May 23-27, 2016.
Notice of Allowance dated Feb. 21, 2019 in U.S. Appl. No. 15/659,027.
Advisory Action dated Dec. 27, 2018 in U.S. Appl. No. 15/659,027.
Final Office Action dated Oct. 15, 2018 in U.S. Appl. No. 15/659,027.
Office Action dated May 4, 2018.
R2-161140, 3GPP TSG RAN WG2 Meeting #93, Sony, "System Information Area Scope and Value Tag", St. Julian's, Malta, Feb. 15-19, 2016.

* cited by examiner

USER EQUIPMENT, BASE STATION APPARATUS, COMMUNICATION METHOD OF A USER EQUIPMENT AND COMMUNICATION METHOD OF A BASE STATION APPARATUS

CROSS-REFERENCE TO RELATED APPLICATIONS

This application is a continuation of U.S. patent application Ser. No. 15/659,027 filed Jul. 25, 2017, which claims the priority and benefit of U.S. Provisional Patent application 62/367,590, filed Jul. 27, 2016, both of which are incorporated herein by reference in their entirety.

FIELD

The technology relates to wireless communications, and particularly to methods and apparatus for requesting, transmitting, and using system information (SI) in wireless communications.

BACKGROUND

In wireless communication systems, a radio access network generally comprises one or more access nodes (such as a base station) that communicate on radio channels over a radio or air interface with plural wireless terminals. In some technologies, such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on the radio channels certain information which is required for mobile stations to access the network. In Long-Term Evolution (LTE) and LTE Advanced (LTE-A), such information is called "system information" ("SI"). Each access node, such as an evolved NodeB ("eNB"), broadcasts such system information to its coverage area via several System Information Blocks (SIBs) on downlink radio resources allocated to the access node.

A wireless terminal ("UE"), after entering a coverage area of an eNB, is required to obtain all the SIBs which are necessary to access the system. For sake of UEs under coverage, the eNB periodically broadcasts all SIBs relevant for offered services, not just SIBs that are required for access to the system. Each type of SIBs is transmitted in a designated radio resource(s) with its own pre-determined/configurable frequency.

This all-broadcast-based periodic delivery method (e.g., collective broadcast of all SIBs, not just those necessary for system access) is efficient under a condition where many UEs are almost always flowing into the coverage area (such as a macro cell). However, this approach may result in wasting valuable radio resources in case of small cell deployment. Therefore, more efficient methods of SIB transmission are desired.

What is needed, therefore, and an example object of the technology disclosed herein, are methods, apparatus, and techniques for more efficient transmission of system information blocks (SIBs).

SUMMARY

In one of its example aspects, the technology disclosed herein concerns an access node of a radio access network. The access node comprises processor circuitry and a transmitter. The processor circuitry is configured to generate a value tag associated with system information. The system information facilitates the use of communication services provided by the access node. The transmitter is configured to transmit, over a radio interface, node-available system information comprising an identification of the system information and the value tag associated with the system information.

In another of its example aspects, the technology disclosed herein concerns a method in an access node of a radio access network. In a basic implementation the method comprises generating a value tag associated with system information, the system information facilitating the use of communication services provided by the access node; and, transmitting over a radio interface node-available system information comprising an identification of the system information and the value tag associated with the system information.

In another of its aspects, the technology disclosed herein concerns a wireless terminal which communicates over a radio interface with an access node of a radio access network. The wireless terminal basically comprises a receiver and processor circuitry. The receiver is configured to receive from the access node a system information availability message comprising an identification of node-available system information and a node-transmitted value tag associated with the node-available system information. The processor circuitry is configured on the basis of the node-transmitted value tag to determine whether to request that the node-available system information be transmitted to the wireless terminal.

In another of its example aspects, the technology disclosed herein concerns a method in a wireless terminal that communicates over a radio interface with an access node of a radio access network. In a basic mode the method comprises receiving from the access node a system information availability message comprising an identification of node-available system information and a node-transmitted value tag associated with the node-available system information; and, on the basis of the node-transmitted value tag determining whether to request that the node-available system information be transmitted to the wireless terminal.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
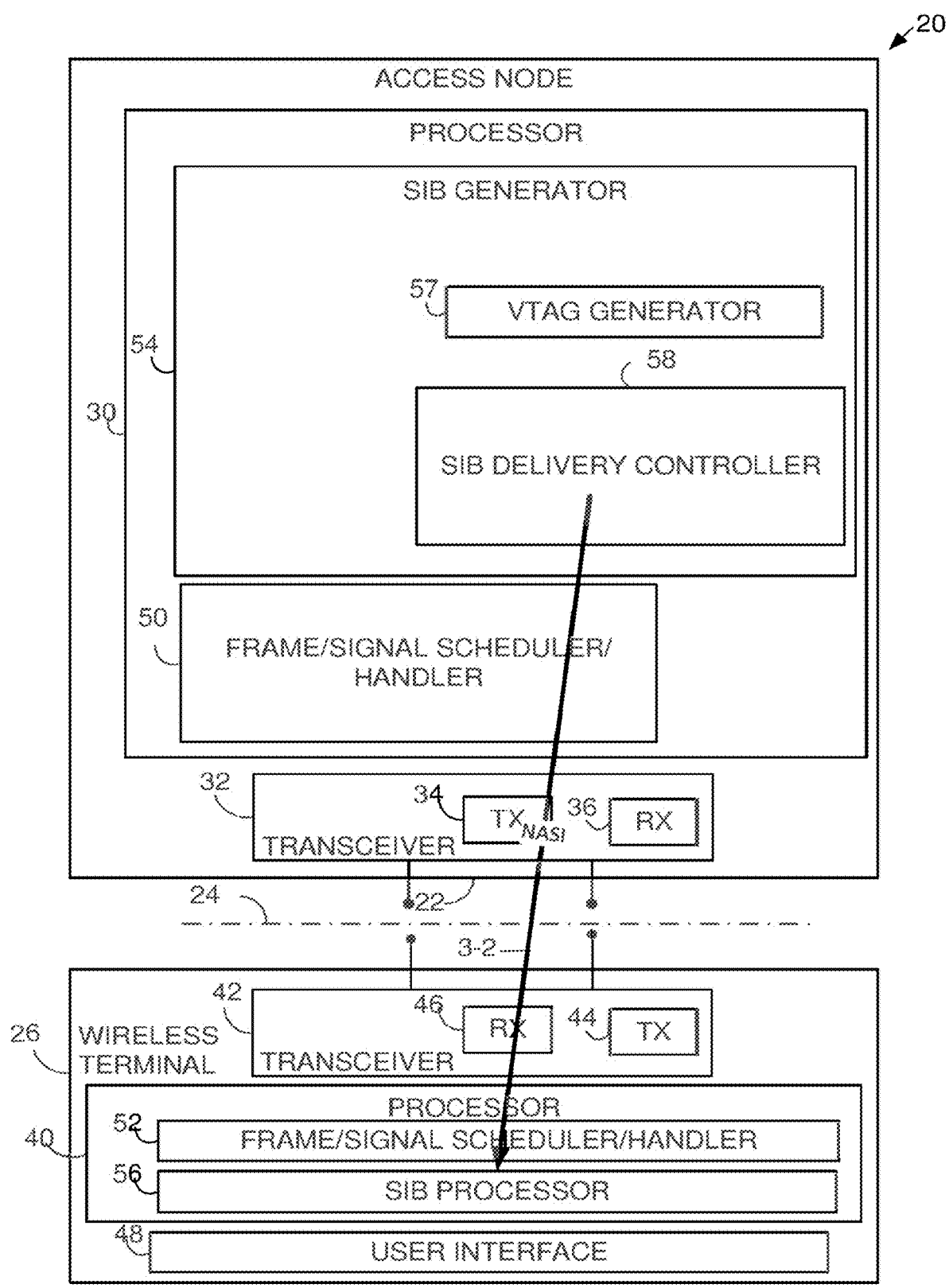
FIG. 1 is a schematic view showing an example communications system comprising a radio access node and a wireless terminal, and wherein the radio access node provides a value tag for system information (SI).

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node," "node," or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a gNB (for the 5G "New Radio" [NR]), a home eNB ("HeNB") or some other similar terminology. Another non-limiting example of a base station is an access point. An access point may be an electronic device that provides access for the wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication systems.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

FIG. 1 shows an example communications system 20 wherein radio access node 22 communicates over air or radio interface 24 (e.g., Uu interface) with wireless terminal 26. As mentioned above, the radio access node 22 may be any suitable node for communicating with the wireless terminal 26, such as a base station node, or eNodeB ("eNB"), or gNB, for example. The radio access node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device.

For both the radio access node 22 and the wireless terminal 26, the respective transceiver circuitries 32 and 42 include antenna(s). The respective transmitter circuits 34 and 44 may comprise, e.g., amplifier(s), modulation circuitry, and other conventional transmission equipment. The respective receiver circuits 36 and 46 may comprise, e.g., amplifiers, demodulation circuitry, and other conventional receiver equipment.

In general operation, the radio access node 22 and wireless terminal 26 communicate with each other across radio interface 24 using predefined configurations of information. By way of non-limiting example, the radio access node 22 and wireless terminal 26 may communicate over the radio interface 24 using "frames" of information that may be configured to include various channels. In LTE, for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on the downlink (DL) from the radio access node to the wireless terminal; an SC-FDMA symbol in an uplink (UL) frame from the wireless terminal to the radio access node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks).

To cater to the transmission of information between the radio access node 22 and the wireless terminal 26 over the radio interface 24, the node processor 30 and terminal processor 40 of FIG. 1 are shown as comprising respective information handlers. For an example implementation in which the information is communicated via frames, the information handler for the radio access node 22 is shown as node frame/signal scheduler/handler 50, while the information handler for wireless terminal 26 is shown as terminal frame/signal scheduler/handler 52.

The node processor 30 of a radio access node 22 also includes a system information (SI) generator 54. The wireless terminal 26 uses the system information (SI) generated by radio access node 22, and even in some example implementations specifically requests certain system information (SI), in an on-demand fashion. To that end, the terminal processor 40 of wireless terminal 26 is shown as comprising SIB processor 56.

The node processor 30, and system information (SI) generator 54, in particular, generates a value tag that is associated with the system information (SI). The value tag, also known as a version tag or "Vtag," is configured to provide an indication of the version or vintage of system information with which the value tag is associated. In some example implementations the value tag may take the form of a numeral or character, e.g., "1" for the first version, "2" for the second version, etc., or "A" for the first version, "B," for the second version, etc. Any other convention for differentiating between values or versions may instead be employed. To this end, system information (SI) generator 54 is shown as comprising value tag generator 57.

The value tag generator 57 serves, e.g., to change the value tag when a parameter of the system information is changed. For example, the value tag generator 57 may increment a number of the value tag when a parameter of the second type system information is changed.

Figure 2:
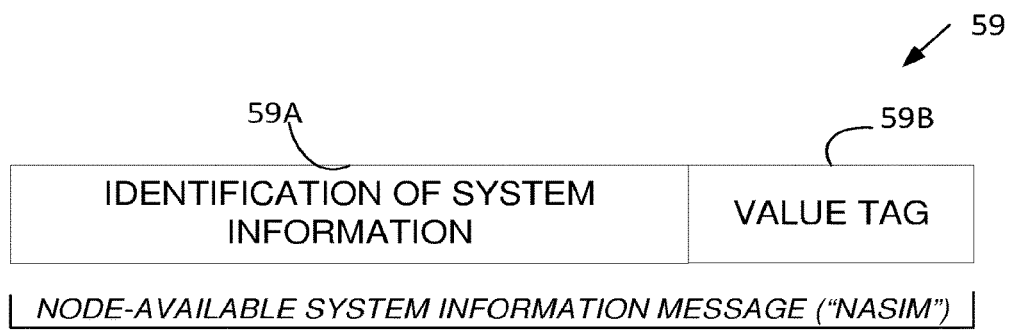
FIG. 2 is a diagrammatic view of a node-available system information message according to an example embodiment and mode.

The system information (SI) generator 54 also comprises SIB delivery controller 58, which controls the timing and content of delivery of system information (SI), as well as timing and delivery of certain node-available system information ("NASI"). In an example embodiment and mode illustrated in FIG. 2, the node-available system information comprises a node-available system information message NASIM 59 that includes both an identification of the system information that is available from the radio access node 22, and the value tag associated with that available system information. To this end, the NASIM 59 of FIG. 2 shows an identification of system information field or information element 59A, and a value tag field or information element 59B.

Figure 3:
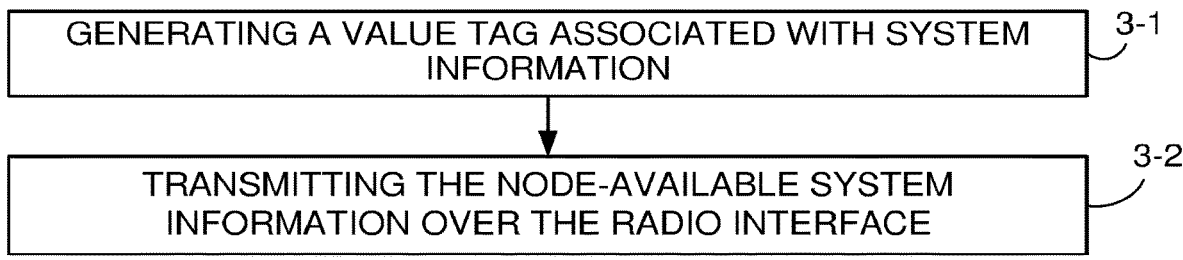
FIG. 3 is a flowchart showing an example, representative, basic acts, or steps performed by the radio access node of FIG. 1.

FIG. 3 depicts a certain example, representative, basic acts or steps performed by the radio access node 22 of FIG. 1. Act 3-1 comprises generating a value tag associated with system information that is available at the radio access node 22. As is understood in the art, the system information facilitates the use of communication services provided by the access node. Act 3-2 comprises transmitting over the radio interface 24 the node-available system information ("NASI"). Such transmission may be by means of the node-available system information message NASIM 59. An arrow 3-2 in FIG. 1 corresponds to act 3-2 (and, in an example implementation, to the node-available system information message NASIM 59). As indicated above and with respect to FIG. 2, the node-available system information message comprises an identification of the system information and the value tag associated with the system information.

Figure 4:
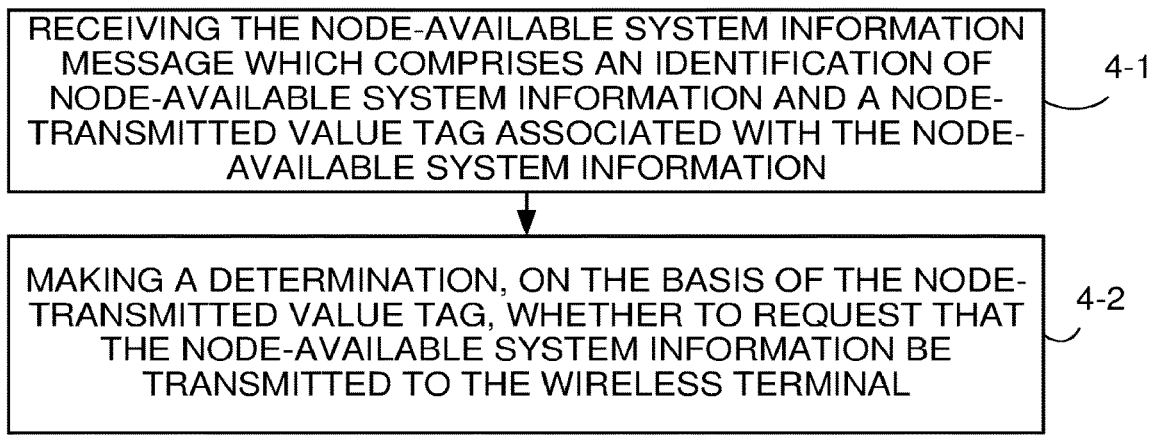
FIG. 4 is a flowchart showing an example, representative, basic acts, or steps performed by the wireless terminal of FIG. 1

FIG. 4 depicts a certain example, representative, basic acts or steps performed by the wireless terminal 26 of FIG. 1. Act 4-1 comprises receiving, from the radio access node 22, the node-available system information message (3-2) that comprises an identification of node-available system information and a node-transmitted value tag associated with the node-available system information. Act 4-2 comprises making a determination, on the basis of the node-transmitted value tag, whether to request that the node-available system information be transmitted to the wireless terminal. If the determination of act 4-2 indicates that the available system information as advertised in the node-available system information message (3-2) should be obtained (e.g., because that available system information has a more recent value tag), then the wireless terminal 26 sends a request message to the radio access node 22 to obtain the advertised system information.

Figure 5:
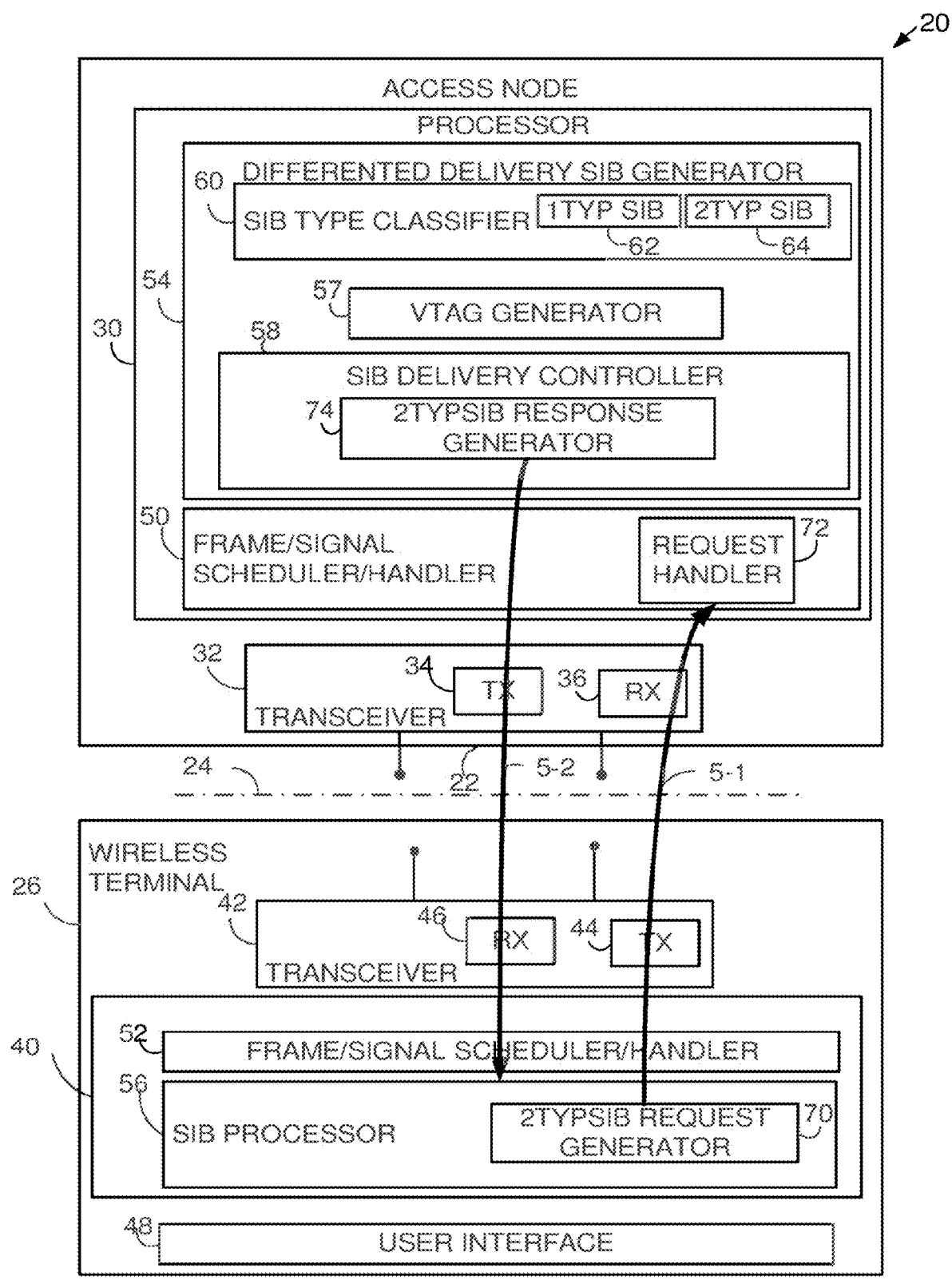
FIG. 5 is a schematic view showing an example communications system comprising a radio access node and a wireless terminal, and wherein the radio access node provides a value tag for system information (SI) along with differentiated delivery of system information (SI).

FIG. 5 illustrates a certain example embodiment and mode wherein system information (SI) is classified into plural categories or types, and delivery of each category or type of system information (SI) is separately triggered and thus separately delivered across the radio interface 24 to one or more wireless terminals. Accordingly, the system information (SI) generator of a radio access node 22 is also known as differentiated delivery SIB generator 54.

In view of the fact that, in certain example embodiments and modes, the system information (SI) is classified into plural categories or types, the system information (SI) generator 54 is depicted in FIG. 5 as comprising SIB type classifier 60 that defines the plural categories or types of system information, and may further define an association between the plural types and respective system information blocks. For sake of examples, two representative categories or types of system information (SI) are shown as defined by the SIB type classifier 60 in FIG. 5: a first type of system information (1TYP SIB) and a second type of system information (2TYP SIB). Definitions and procedures for handling for the first type of system information (1TYP SIB) and the second type of system information (2TYP SIB) may be selectively configured and maintained, and are accordingly reflected by 1TYPSIB controller 62 and 2TYPSIB controller 64, respectively.

In an example embodiment and mode, the first type of system information (1TYP SIB) is SIB "essential system information," which means system information (SI) which is essential to or minimally required by the wireless terminal 26 for initial access to the radio access network and to the radio interface 24 in particular. Essential system information may also be referred to as "minimum system information." On the other hand, in the same example embodiment and mode, the second type of system information (2TYP SIB) is non-essential system information (SI). "Non-essential" system information (SI) is defined as all other types of information, and thus excludes the minimal information required for initial access. As such, the second type of system information (2TYP SIB) may facilitate the utilization of certain features or services provided by or through the radio access node 22. Non-essential system information may also be referred to as "other system information." Thus, the first type system information comprises information that is periodically broadcasted by the transmitter and which is required for initial access to the radio access network, but the second type system information is not required for initial access to the radio access network.

In some example embodiments and modes described herein, the radio access node 22 separately delivers the different types of system information, e.g., delivers the second type of system information (2TYP SIB) separately from the first type of system information (1TYP SIB). For example, the node processor 30 may schedule periodic transmissions by the transmitter of first type system information over the radio interface; and thereafter or separately from the periodic transmissions of the first type system information, schedule transmission by the transmitter of second type system information over the radio interface. Accordingly, in example embodiments and modes, the SIB delivery controller 58, among other things, may implement the "differentiated" delivery of the second type of system information (2TYP SIB) apart from the first type of system information (1TYP SIB). As explained herein, the transmission of second type system information may be either by unicast or broadcast.

FIG. 5 further illustrates that the wireless terminal 26 may, after obtaining initial access to the communications system 20 (e.g., as a result of receiving the first type of system information (1TYP SIB)), recognize or appreciate that the wireless terminal 26 may lack and need the second type of system information (2TYP SIB). Thus, the wireless terminal 26 may make a special request for, and receive from the radio access node 22, the second type of system information (2TYP SIB). The FIG. 5 embodiment and mode is thus an example of the radio access node 22 providing second type system information "on demand." Such request or demand for the second type of system information (2TYP SIB) may arise, for example, when the wireless terminal 26 seeks to utilize a certain service provided by the communications system 20 or functionality of the wireless terminal 26 which, although not required for access, may enhance the operation of the wireless terminal 26. Accordingly, FIG. 5 shows the SIB processor 56 of the wireless terminal 26 as comprising 2TYPSIB request generator 70, which may generate a 2TYPSIB request depicted by arrow 5-1.

FIG. 5 further shows node frame/signal scheduler/handler 50 as comprising 2TYPSIB request handler 72, and further shows the SIB delivery controller 58 as comprising 2TYPSIB response generator 74. In FIG. 5 embodiment and mode, the 2TYPSIB response generator 74 generates a response message 5-2 that includes one or more requested system information blocks (SIBs), e.g., includes at least one block of the second type system information.

Thus, in FIG. 5 embodiment and mode, the node processor 30 schedules periodic transmissions by the transmitter of first type system information over the radio interface. Thereafter or separately from the periodic transmissions of the first type system information, and upon request by the wireless terminal 26, the node processor 30 schedules transmission by the transmitter of second type system information over the radio interface. The request by the wireless terminal 26 may arise after the wireless terminal 26 receives the node-available system information message NASIM 59, which advises of the value tag for the node-available system information. Thus, in FIG. 5 embodiment and mode, the value tag is associated with the second type system information.

Figure 6:
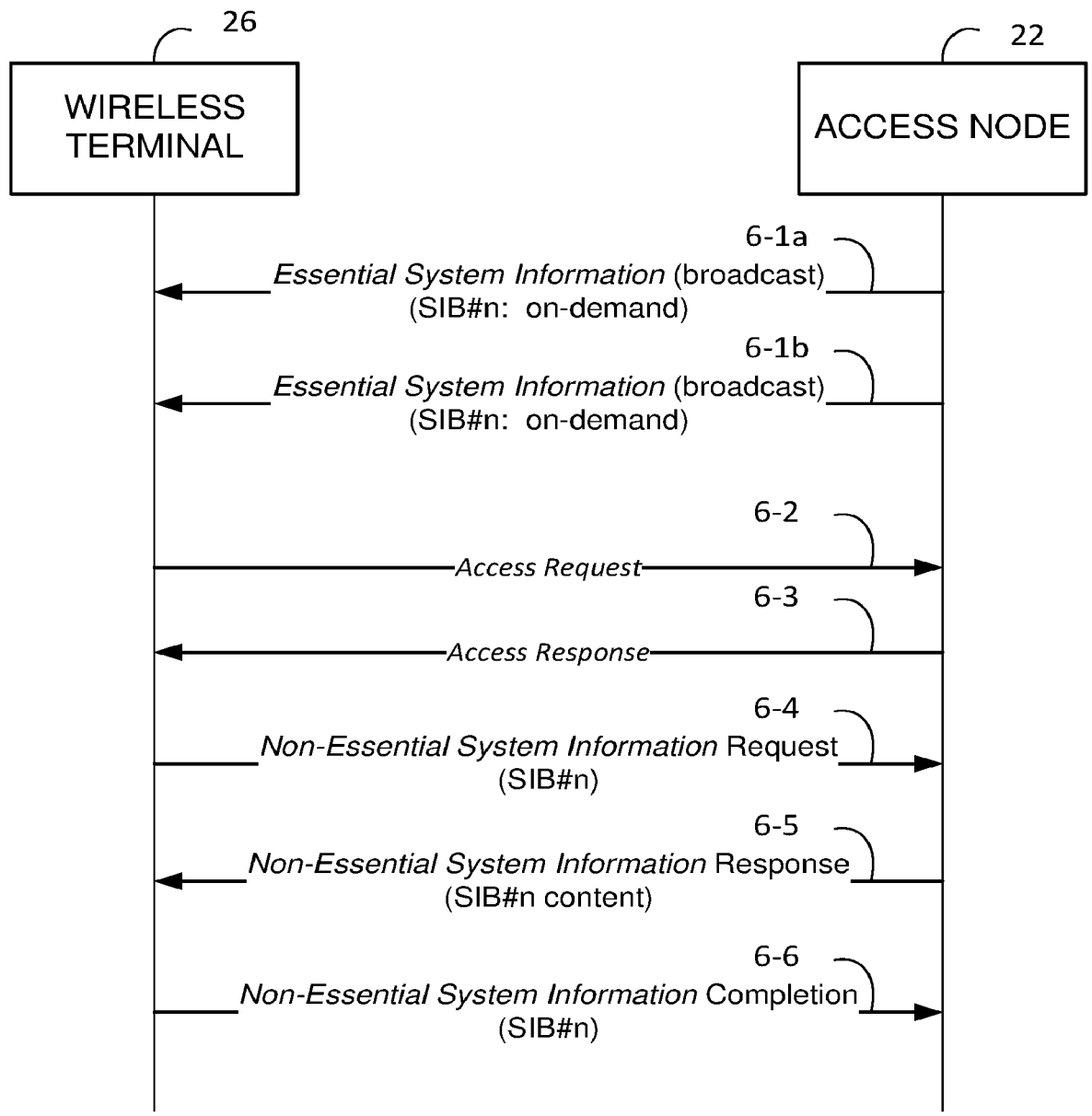
FIG. 6 is a diagrammatic view showing an example message flow for the example communications system of FIG. 5.

FIG. 6 shows an example message flow for the embodiment of FIG. 5. In FIG. 6 message flow, when a wireless terminal enters the coverage area of the radio access node 22, the wireless terminal first receives from the radio access node 22 the Essential System Information (i.e., the first type of system information (1TYP SIB)), and in particular receives Essential System Information periodically broadcasted in messages containing the essential SIB(s) as information elements. The periodic broadcast by the radio access node 22 of the Essential System Information is shown by messages 6-1-*a* and 6-1-*b* of FIG. 6. It is understood (in FIG. 6 and other similar drawings) that there may be more than two such broadcast messages. An example Essential System Information message for the FIG. 5 embodiment and mode are shown in FIG. 7 and hereinafter described.

Figure 7:
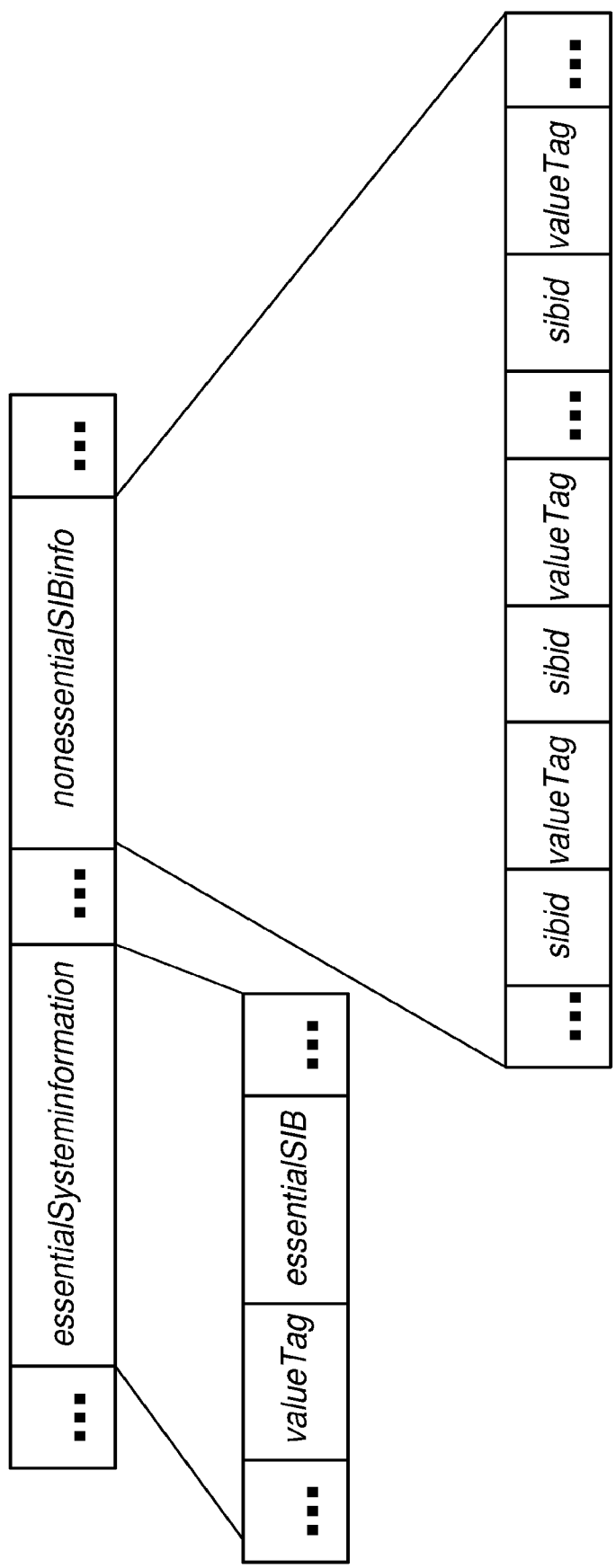
FIG. 7 is a diagrammatic view showing an example format of an Essential System Information message according to an example implementation of the system of FIG. 5.

As shown in FIG. 7, the Essential System Information message may comprise a nonEssentialSIBInfo information element that includes the identification of the non-essential SIBs. If the nonEssentialSIBInfo information element is not present in the message, or if the information element is present but the list is empty, the wireless terminal assumes that all the SIBs from this radio access node 22 are essential SIBs.

Upon receiving the Essential System Information, i.e., the first type of system information (1TYP SIB), the wireless terminal 26 initiates the system access procedure by sending an Access Request message 6-2, which is acknowledged by the radio access node 22 with an Access Response message 6-3. Following the system access procedure (comprised of the acts just described), the wireless terminal 26 sends a Non-Essential System Information Request message 6-4 to the radio access node 22. The Non-Essential System Information Request message 6-4 may be generated by 2TYP SIB request generator 70 of FIG. 5, and may include an indication of one or more pieces of the second type of system information (2TYP SIB), e.g., one or more SIB numbers (SIB #), that the wireless terminal 26 desires. The wireless terminal 26 was made aware of the existence of the second type system information by the nonessentialSIBinfo information element. Such an indication of desired SIB # may be expressed in an information element of the Non-Essential System Information Request message 6-4. The Non-Essential System Information Request message 6-4 may be sent using uplink dedicated resources (e.g., radio resources of a frame).

In response to the Non-Essential System Information Request message 6-4, the radio access node 22 may send Non-Essential System Information Response message 6-5 using the downlink dedicated resources. The Non-Essential System Information Response message 6-5 comprises the requested SIB #n (e.g., the SIB #n requested by the wireless terminal 26). The requested SIB #n may be included in an information element of the Non-Essential System Information Response message 6-5. Afterward, when the wireless terminal 26 has successfully obtained the requested SIB #n from the Non-Essential System Information Response message 6-5, the wireless terminal 26 may send to the radio access node 22 a Non-Essential System Information Completion message 6-6, at which point the radio access node 22 may release the uplink/downlink dedicated resources. Alternatively, the radio access node 22 may release the uplink/downlink dedicated resources after sending Non-Essential System Information Response message 6-5.

An example Essential System Information message for the FIG. 5 embodiment and mode is shown in FIG. 7. In the embodiment and mode of FIG. 5 and FIG. 6, one or more, and preferably a non-essential (e.g., second type) SIB is associated with a value tag that uniquely identifies a specific version of the content for that SIB. When broadcasting Essential System Information message, the radio access node 22 of FIG. 5 includes the value tags for the latest contents of non-essential SIBs. Further, the value tag changes when any configuration parameters in the corresponding SIB gets updated. In one example implementation, the value tag is incremented by one upon the SIB update. Other types of modifications, e.g., decrementation, version prefixes or suffixes, may be employed.

FIG. 7 shows an example format of the Essential System Information message, wherein in the nonEssentialSIBInfo information element each sibId is paired with valueTag, the value tag of the corresponding non-essential SIB. Thus, in an example implementation, the node-available system information message NASIM 59 may be an Essential System Information message, as shown in FIG. 7. FIG. 7 particularly shows that the Essential System Information message may also, when functioning as the node-available system information message NASIM 59, include an information element specifying what non-essential SIBs are available at this radio access node 22 upon request. FIG. 7 shows the essentialSystemInformation information element carrying at least one essential SIB, and a nonEssentialSIBInfo information element may include a list of identifiers (sibId's) for such available non-essential SIBs. In addition, for one or more and preferably each non-essential SIBs, a value tag is provided in the nonEssentialSIBInfo information element.

FIG. 7 also shows that Essential SIB(s) may also be associated with at least one value tag, which is different from the ones for non-essential SIBs, and may be conveyed as a part of the Essential System Information message.

In a certain example, embodiments and modes, the value tag of a non-essential SIB may be valid within one radio access node 22, e.g., valid within a coverage area or cell served by the radio access node 22. But in other example embodiments and modes, the value tag may have collective applicability, e.g., be capable of expressing a value for more than one cell, for more than one piece of system information (e.g., more than one SIB), etc. In other words, the applicable "base" of the value tag, the information to which the value tag pertains, may be selectively defined in terms of various factors such as area, number of SIBs, and so forth.

Figure 8:
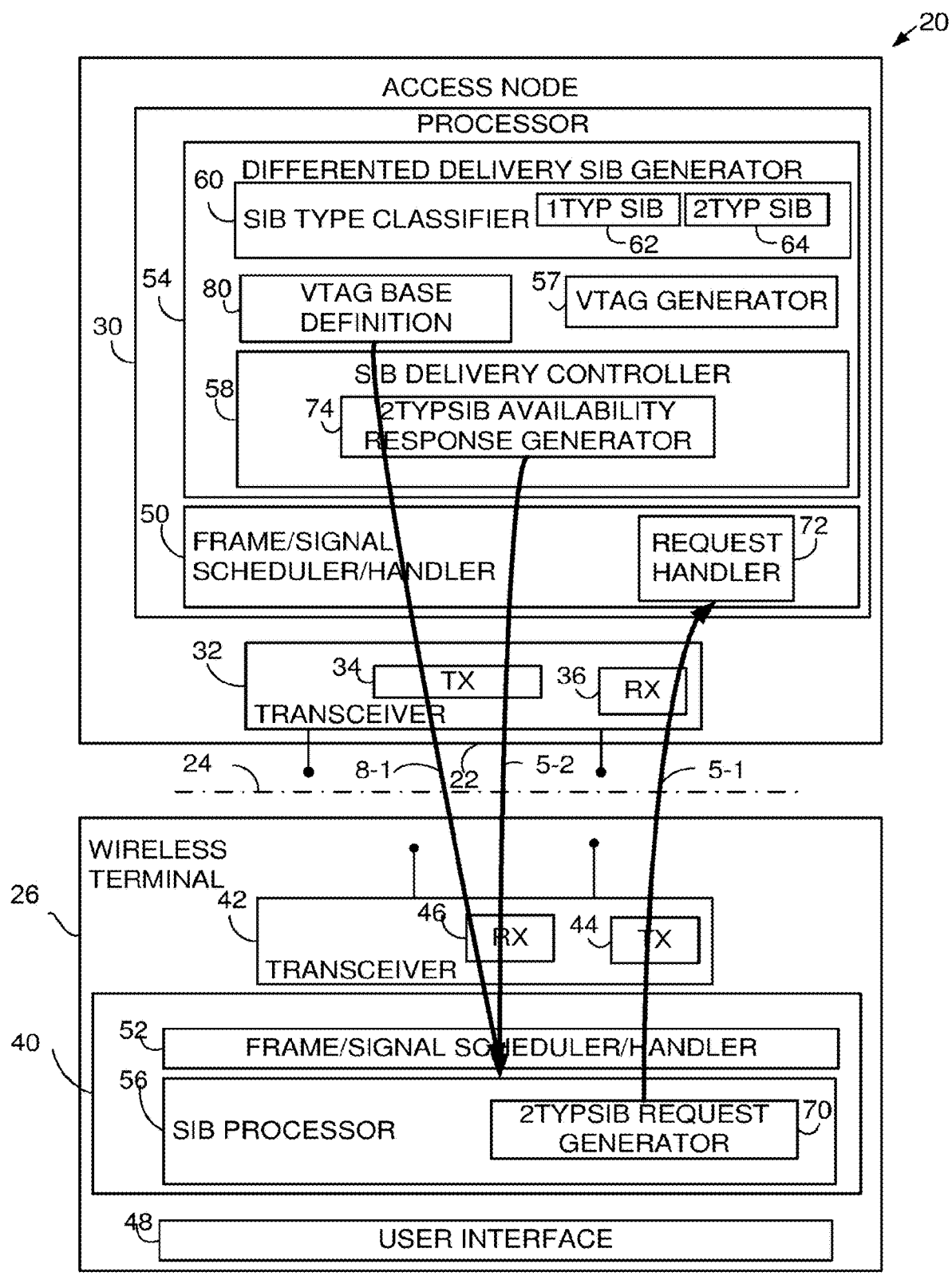
FIG. 8 is a schematic view showing an example communications system comprising a radio access node and a wireless terminal, and wherein the radio access node provides a value tag for system information (SI) along with a definition of a base of second type system information to which the value tag applies.

In the above regard, in an example embodiment and mode shown in FIG. 8, the system information (SI) generator 54 includes not only the value tag generator 57, but also logic, memory, or controller for a value tag base definition 80. In an example implementation, for example, the value tag base definition 80 may specify that the value tag is valid in at least one geographical area comprising a plurality of radio access nodes. Thus, the node processor 30 may generate the value tag to be valid in a geographical area served by the access node and a group of at least one other access node. In such example implementation, the value tag base definition 80, or value tag "validity area," may be separately signaled from the radio access nodes to the wireless terminals in their respective coverage areas. That is, the node processor 30 may generate a signal (such as signal 8-1 of FIG. 8) to define the group of other access nodes.

Thus, in FIG. 8 embodiment and mode, a wireless terminal may consider the non-essential system information, a second type SIB, to be "current" if (1) it was received in the validity area of the radio access node upon which the wireless terminal is camping; (2) the value tag of the received non-essential SIB is the same as the one that the camped radio access node is currently advertising in the Essential System Information message, and (3) it was received within a pre-determined or network-configured (e.g., configured by eNB) time period from the present time.

Figure 9:
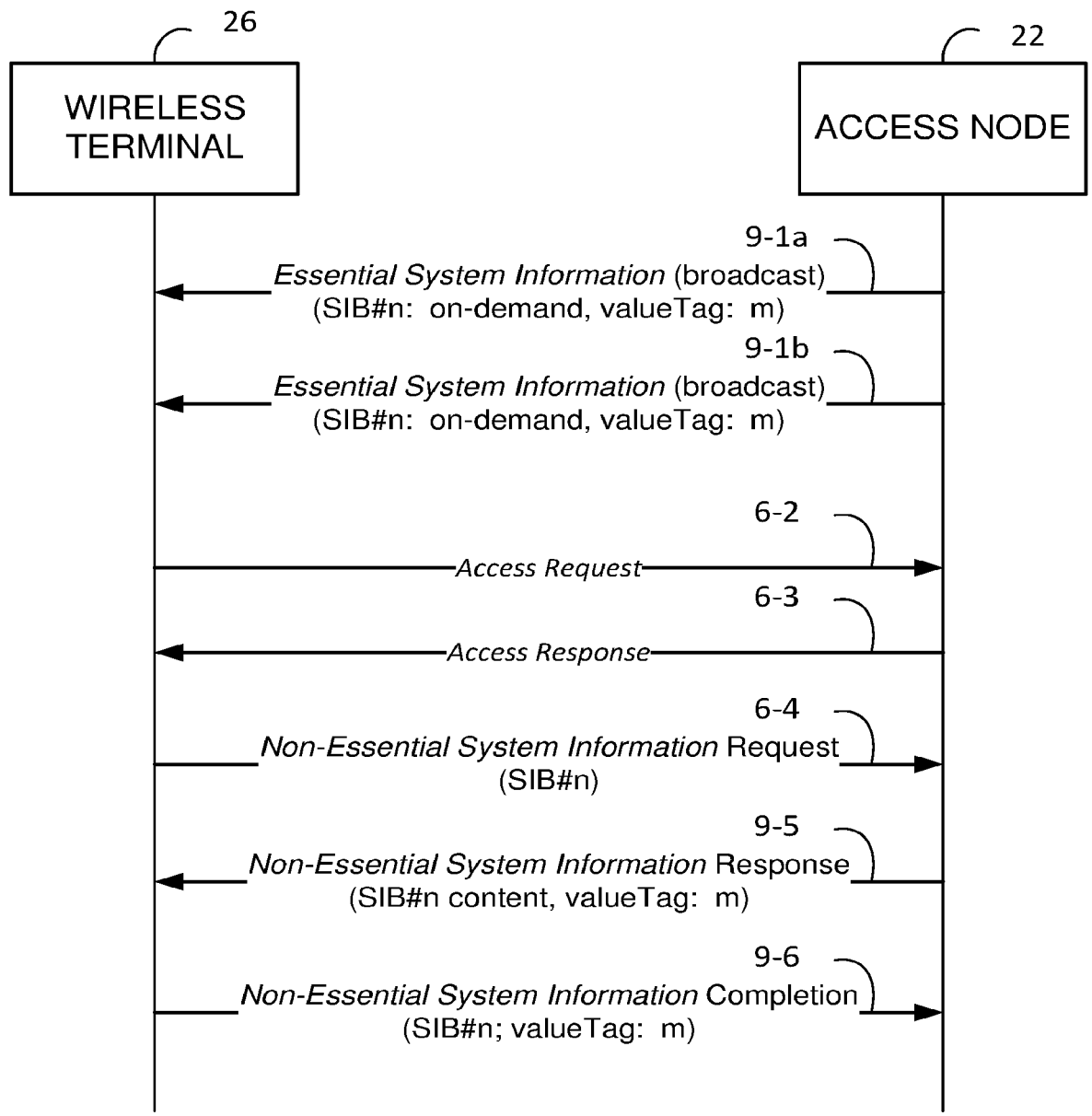
FIG. 9 is a diagrammatic view showing an example message flow for the example communications system of FIG. 8.

FIG. 9 shows an example message flow for the example embodiment and mode of FIG. 8. In the example embodiment and mode of FIG. 8 it is assumed that the wireless terminal 26 makes an on-demand request for second type system information (SI). Accordingly, in FIG. 9, the Essential System Information messages 9-1*a* and 9-1*b* are indicated as being "SIB #n: on-demand." Further, as explained above, the Essential System Information messages 9-1*a* and 9-1*b* may include the value tag ("valueTag: m"). After receiving the Essential System Information, the wireless terminal 26 may perform an access procedure comprising Access Request message 6-2 and Access Response message 6-3.

In FIG. 9 scenario, the wireless terminal 26 may not need to take further actions respecting the second type of system information if the wireless terminal 26 has previously received the SIB #n and the value tag for the previously-received SIB #n as stored at the wireless terminal 26 is current (e.g., is "m"). Otherwise, if the wireless terminal 26 has a value tag for the SIB #n that is older than "m," the wireless terminal 26 may proceed to request the SIB #n transmission using the Non-Essential System Information Request message 6-4, in a manner similar to that described in a previous embodiment.

Thus, in the example embodiment and mode of FIG. 8 and FIG. 9, the Non-Essential System Information Response message 9-5 and/or Non-Essential System Information Completion message 9-6 may contain the value tag with the current value (valueTag=m).

Figure 10:
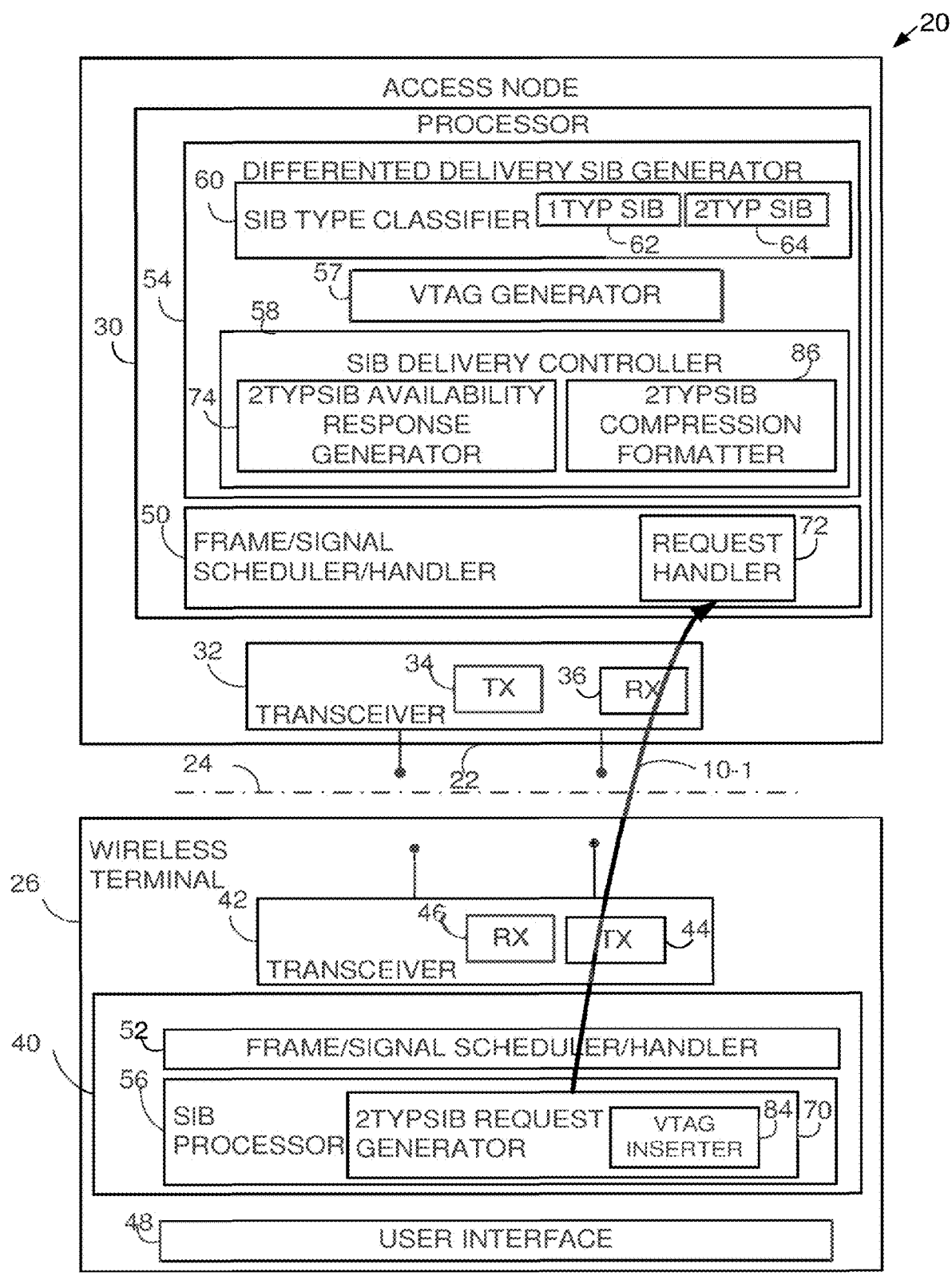
FIG. 10 is a schematic view showing an example communications system comprising a radio access node and a wireless terminal, and wherein the wireless terminal provides a stored value tag for stored second type system information (SI) when requesting second type system information from the radio access node.

In an example embodiment and mode shown in FIG. 10, the wireless terminal 26 may optionally include in request message 10-1 (requesting the second type system information) the stored value tags of the requested second type system information. This may occur in a situation in which the wireless terminal 26 already has stored values for the second type system information and already has stored value tags for the stored second type system information, but the wireless terminal 26 does not know if the stored second type system information is or is not truly current in terms of network usage for each of the stored SIBs of the second type system information. The wireless terminal 26 may request second type system information for plural different second type system information SIBs, and the plural second type system information SIBs may each have different value tags.

In the example embodiment and mode of FIG. 10, the wireless terminal 26 comprises value tag inserter functionality 84, which includes in the request message 10-1 the stored value tag for the second type system information already stored at the wireless terminal 26. Moreover, as understood below, the radio access node 22 and SIB delivery controller 58, in particular, may comprise a compression formatter for the second type system information, e.g., 2TYPSIB compression formatter 86.

Thus, the FIG. 10 example embodiment and mode are similar to the embodiment and mode of FIG. 8, but the wireless terminal 26 may optionally include in the Non-Essential System Information Request message 10-1 the value tags of the requested non-essential SIBs, where the wireless terminal 26 obtained those value tags when it previously received the corresponding non-essential SIBs.

Figure 11:
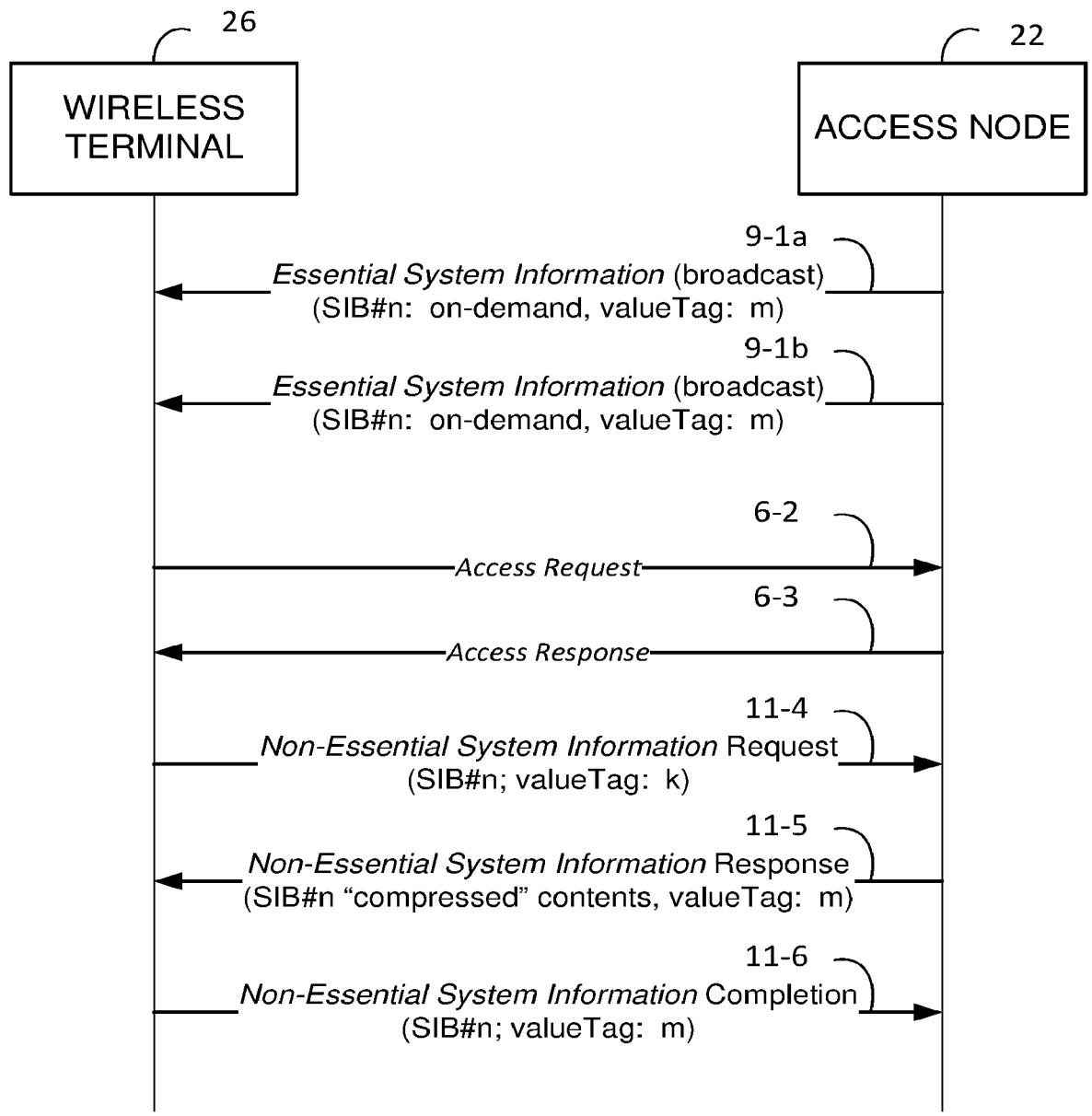
FIG. 11 is a diagrammatic view showing an example message flow for the example communications system of FIG. 10.

An exemplary scenario of the FIG. 10 embodiment and mode is illustrated in the message flow of FIG. 11. FIG. 11 shows, by the Non-Essential System Information Request message 11-4 (which corresponds to message 10-1 of FIG. 10), that valueTag=k for its requested SIB #n. Based on this received value tag, the radio access node 22 and the 2TYPSIB compression formatter 86 in particular may compose the "compressed" content of the SIB #n to be delivered via Non-Essential System Information Response message 11-5. The wireless terminal 26 may send to the radio access node 22 a Non-Essential System Information Completion message 11-6.

In one example implementation of FIG. 10 and FIG. 11, the compressed content comprises the differences between the current SIB #n (valueTag=m) and the previously transmitted (valueTag=k). For example, if SIB #n consists of parameters p1 to p10 and if only p3 and p7 have been updated (if the radio access node 22 has newer values only for parameters p3 and p7 of second type system information), the compressed content of the Non-Essential System Information Response message 11-5 may include only p3 and p7 with updated values.

Figure 12:
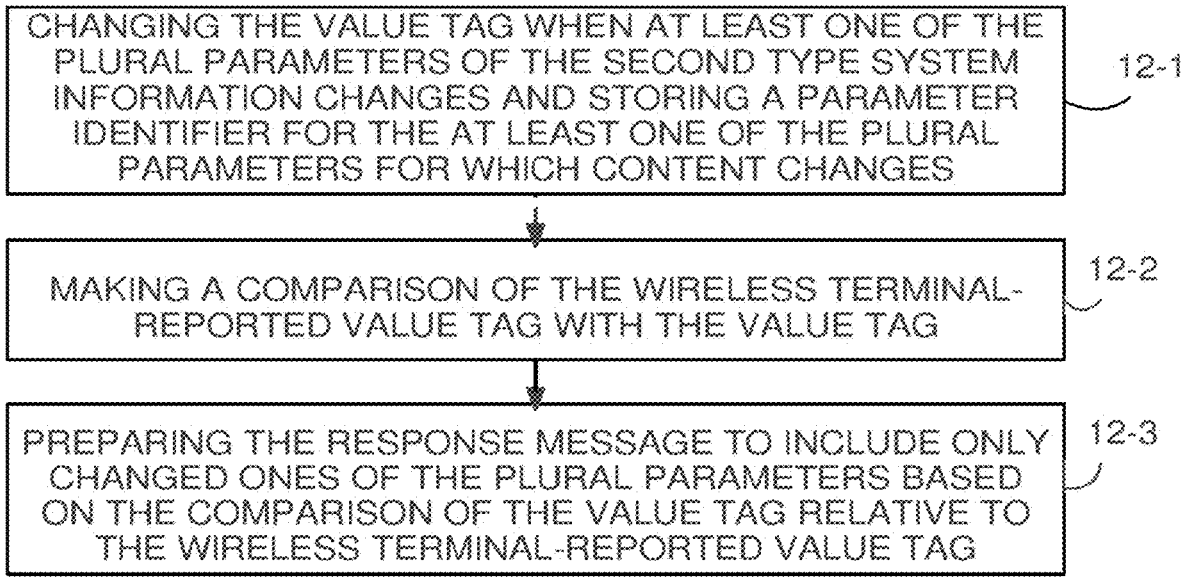
FIG. 12 is a flowchart showing an example, representative, basic acts, or steps performed by the radio access node of FIG. 10 in implementing certain acts of FIG. 11.

Thus the example embodiment and mode of FIG. 10 and FIG. 11 is particularly but not exclusively applicable to situations in which the second type system information comprises plural parameters, and the receiver is configured to receive a wireless terminal-reported value tag in the request message. Basic example acts performed by the radio access node 22 in conjunction with the example embodiment and mode of FIG. 10 and FIG. 11 are shown in FIG. 12. Act 12-1 comprises the node processor 30 (and system information (SI) generator 54 in particular) changing the value tag when at least one of the plural parameters of the second type system information changes and storing a parameter identifier for the at least one of the plural parameters for which content changes. Act 12-2 comprises making a comparison of the wireless terminal-reported value tag (e.g., the value tag reported in the request message 10-1) with the value tag (the changed value tag). Act 12-3 comprises preparing the response message (e.g., the Non-Essential System Information Response message 11-5) to include only changed ones of the plural parameters based on the comparison of the value tag relative to the wireless terminal-reported value tag.

In some cases, the radio access node 22 may have an option to send the non-compressed versions of the requested non-essential SIBs even if the Non-Essential System Information Request message contains value tags. One example of such cases is when the radio access node 22 no longer stores the contents of the previously transmitted non-essential SIBs indicated by the received value tags.

Figure 13:
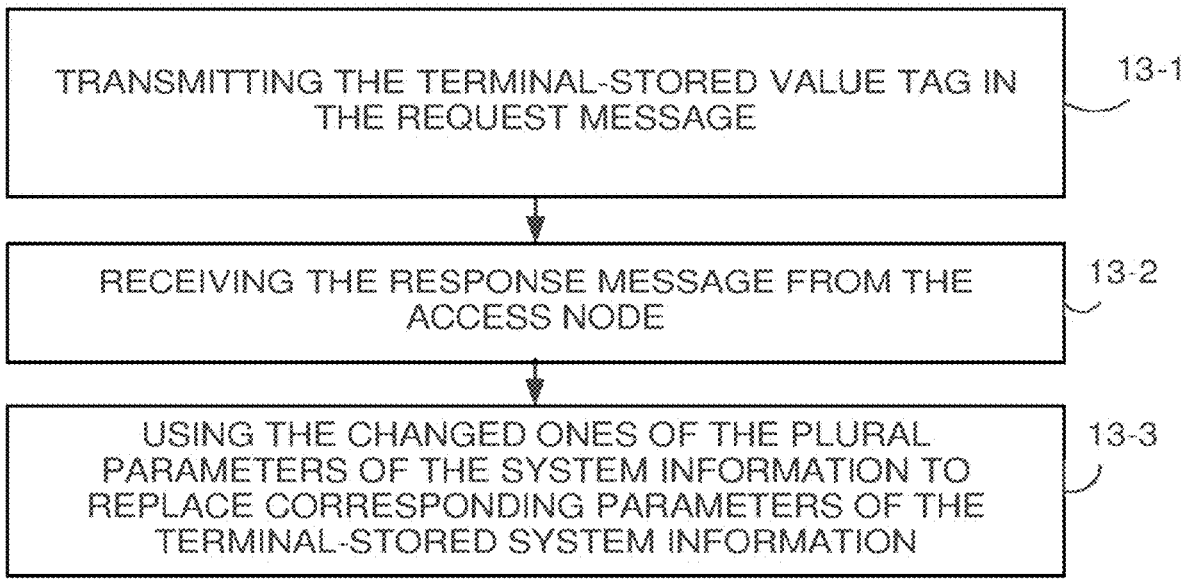
FIG. 13 is a flowchart showing an example, representative, basic acts, or steps performed by the wireless terminal of FIG. 10 in implementing certain acts of FIG. 11.

Basic example acts performed by the wireless terminal 26 in conjunction with the example embodiment and mode of FIG. 10 and FIG. 11 are shown in FIG. 13. Act 13-1 comprises the wireless terminal 26 transmitting the terminal-stored value tag in the request message (e.g., in message 11-4). Act 13-2 comprises the wireless terminal 26 receiving the response message (e.g., message 11-5) from the access node. As mentioned above, the response message includes changed ones of the plural parameters based on a comparison at the access node of the node-reported value tag relative to the terminal-stored value tag. Act 13-3 comprises the wireless terminal 26 using the changed ones of the plural parameters of the system information to replace corresponding parameters of the terminal-stored system information.

In the above regard, the wireless terminal 26 may construct the entire SIB #n using the received compressed content, and the content of SIB #n saved in its memory. In the example described above, the wireless terminal 26 may overwrite saved p3 and p7 with the ones received in the compressed content. The wireless terminal 26 may further update the saved value tag for SIB #n to valueTag=m.

In typical deployments, the content of system information is stable, and even if it has some updates, those updates are generally minor. By the approach described in the example embodiment of FIG. 10 and FIG. 11, it is possible to reduce the data size of the Non-Essential System Information Response message.

Figure 14:
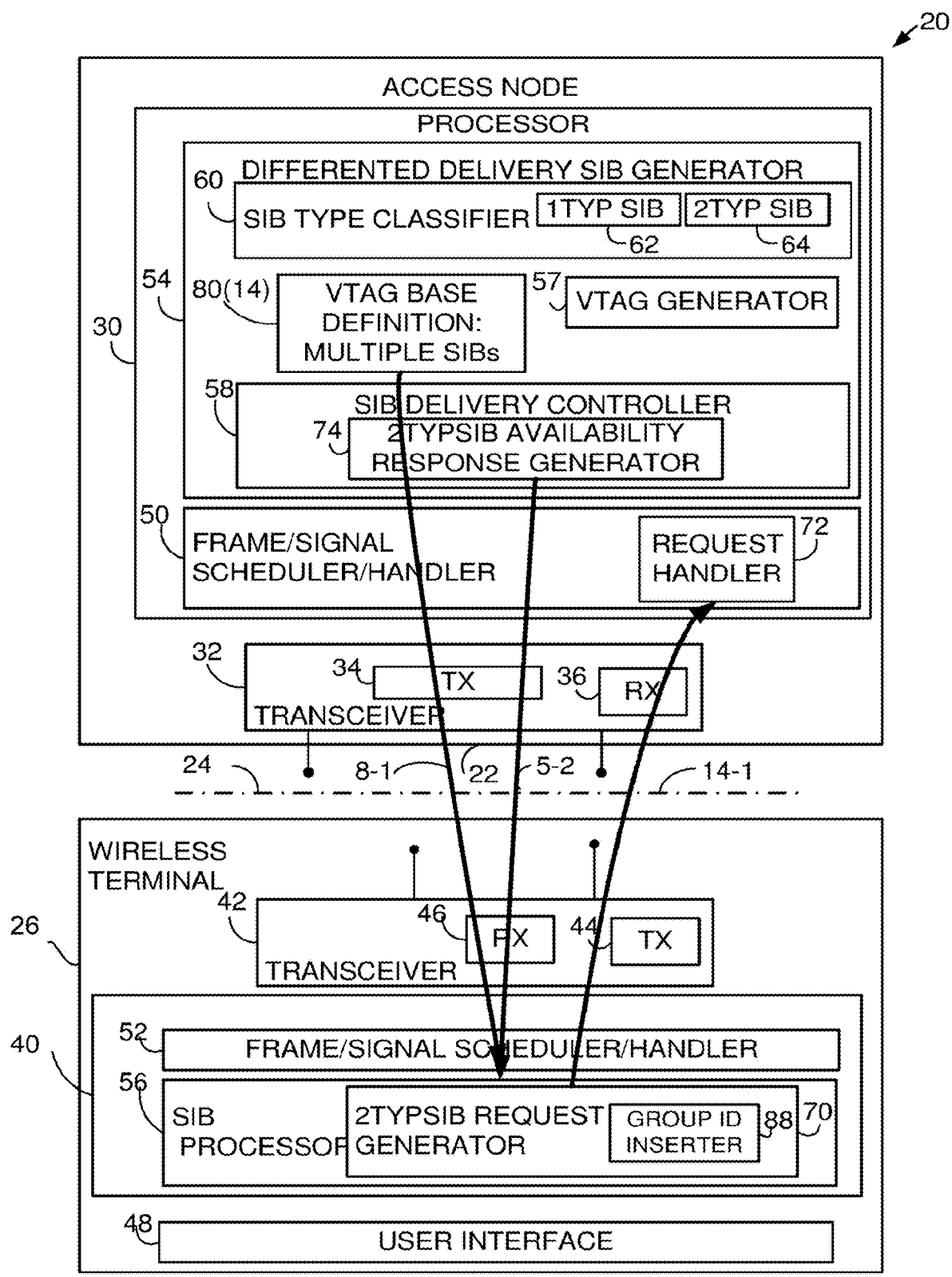
FIG. 14 is a schematic view showing an example communications system comprising a radio access node and a wireless terminal, and wherein the radio access node provides a value tag which is associated with a group of plural system information blocks (SIBs).

The example embodiment and mode of FIG. 14 is similar to the embodiment and mode of FIG. 8, but differs in that a value tag may represent a value or version for an aggregation of multiple non-essential SIBs, e.g., a group of second type system information blocks. In particular, the value tag base definition 80(14) of the embodiment and mode of FIG. 14 defines multiple sibIds associated with one valueTag to thereby form a non-essential or second type system information SIB "group." Thus, in the example embodiment and mode of FIG. 14, the node processor 30 generates the value tag to be associated with a group of plural second type system information blocks. The 2TYP SIB request generator 70 of the wireless terminal 26 of FIG. 14 includes a group identifier inserter ("group ID inserter 88") that includes, in a request message 14-1, an identification of the group of second type system information blocks which are the subject of a second type system information request. The request message 14-1 also may include a value tag associated with the group.

Figure 15:
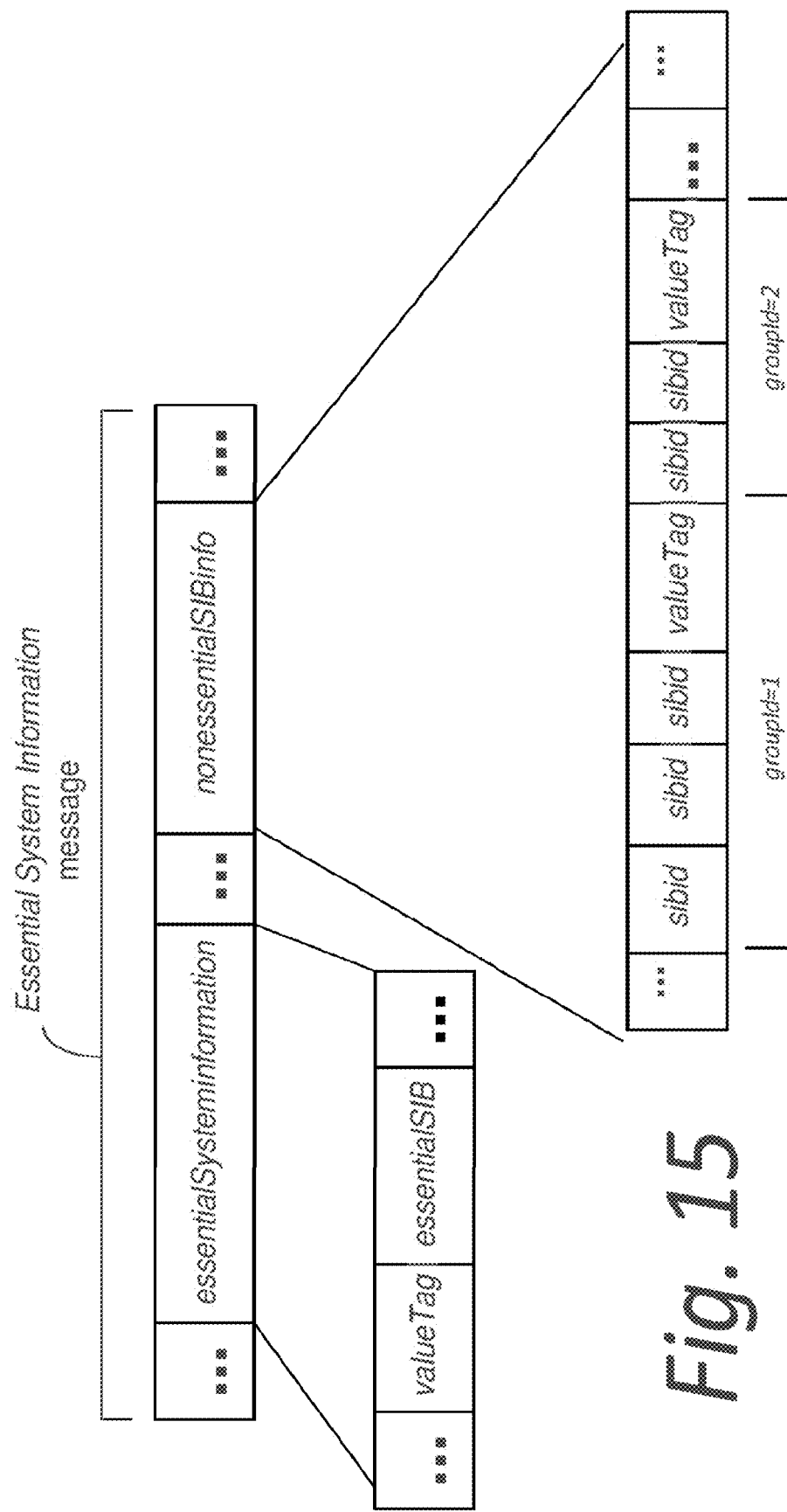
FIG. 15 is a diagrammatic view showing an example format of an Essential System Information message according to an example implementation of the system of FIG. 14, wherein multiple sibIds associated with one valueTag form a non-essential SIB group.

FIG. 15 shows an example format of the Essential System Information message, where multiple sibIds associated with one valueTag forms a non-essential SIB group. The valueTag in each non-essential SIB group of this message is updated when the content of at least one non-essential SIB belonging to this group changes. In one configuration, each non-essential SIB group may be associated with groupId, an index of the group in the order of occurrence in the nonEssentialSIBInfo.

Figure 16:
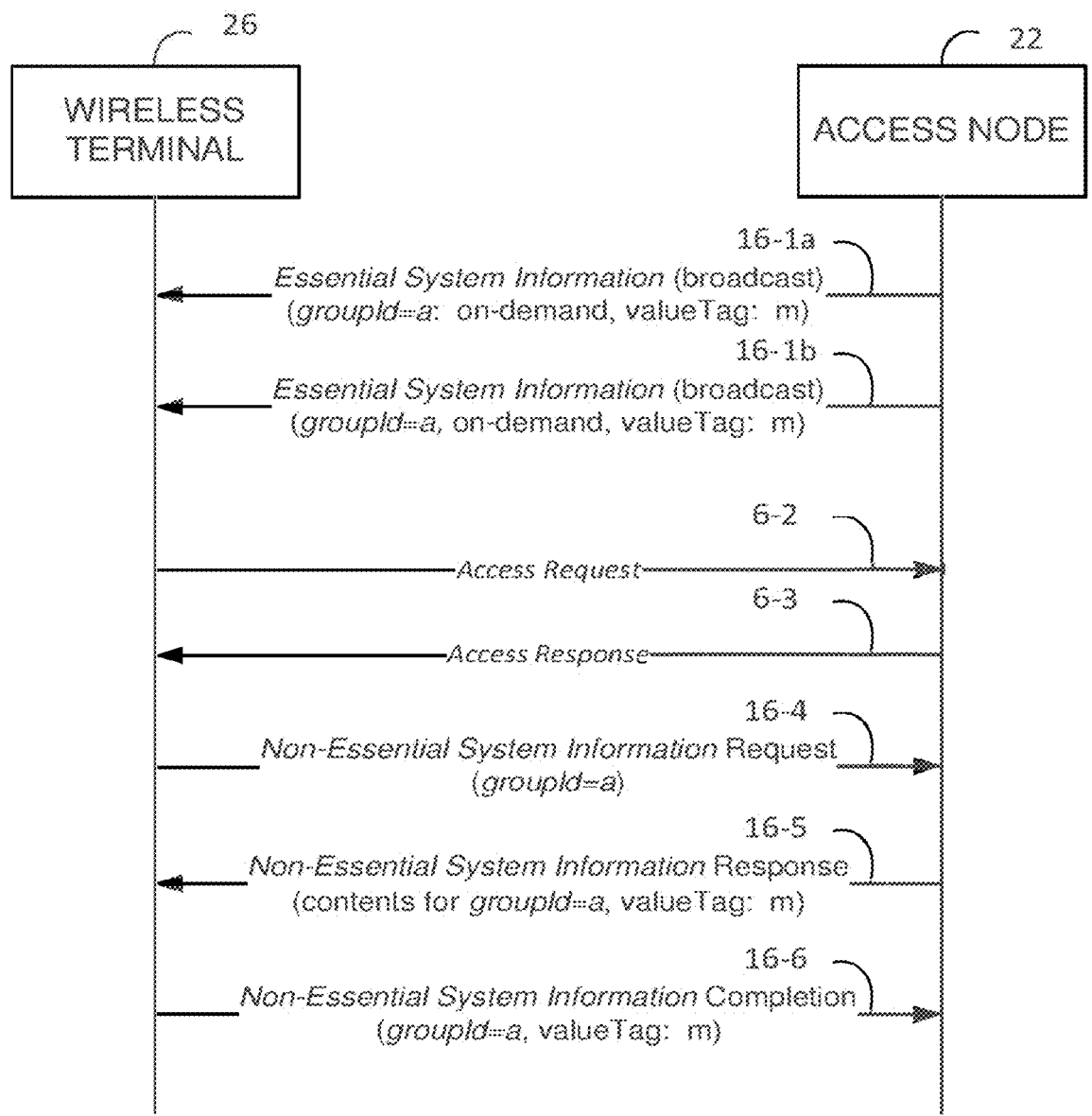
FIG. 16 is a diagrammatic view showing an example message flow for the example communications system of FIG. 14.

FIG. 16 illustrates an example message flow for the embodiment and mode of FIG. 14. FIG. 16 particular shows Essential System Information messages 16-1a and 16-1b as advertising a non-essential SIB group with groupId=a and valueTag=m. The wireless terminal 26, when requesting the contents of the non-essential SIBs belonging to the group, sends to the radio access node 22 the Non-Essential System Information Request message 16-4 containing groupId=a. In response, the radio access node 22 sends Non-Essential System Information Response message 16-5 including the contents of all the non-essential SIBs of the group defined by groupId=a. The wireless terminal 26 may send to the radio access node 22 a Non-Essential System Information Completion message 16-6.

Figure 17:
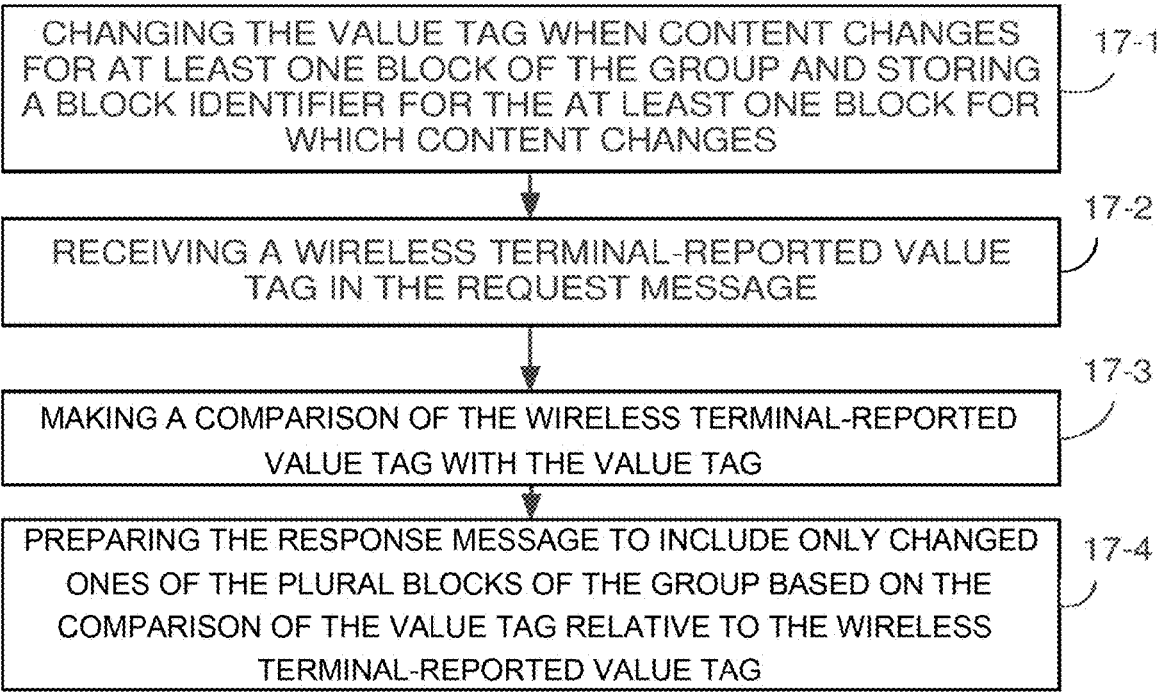
FIG. 17 is a flowchart showing an example, representative, basic acts or steps performed by the radio access node of FIG. 14 in implementing certain acts of FIG. 16.

As explained above, the example embodiment and mode of FIG. 14 and FIG. 16 involves, e.g., generating the value tag to be associated with a group of plural second type system information blocks. Basic example acts performed by the radio access node 22 in conjunction with the example embodiment and mode of FIG. 14 and FIG. 16 are shown in FIG. 17. Act 17-1 comprises changing the value tag when content changes for at least one block of the group and storing a block identifier for the at least one block for which content changes. Act 17-2 comprises receiving a wireless terminal-reported value tag in the request message. Act 17-3 comprises making a comparison of the wireless terminal-reported value tag with the value tag. Act 17-4 comprises preparing the response message to include only changed ones of the plural blocks of the group based on the comparison of the value tag relative to the wireless terminal-reported value tag.

Figure 18:
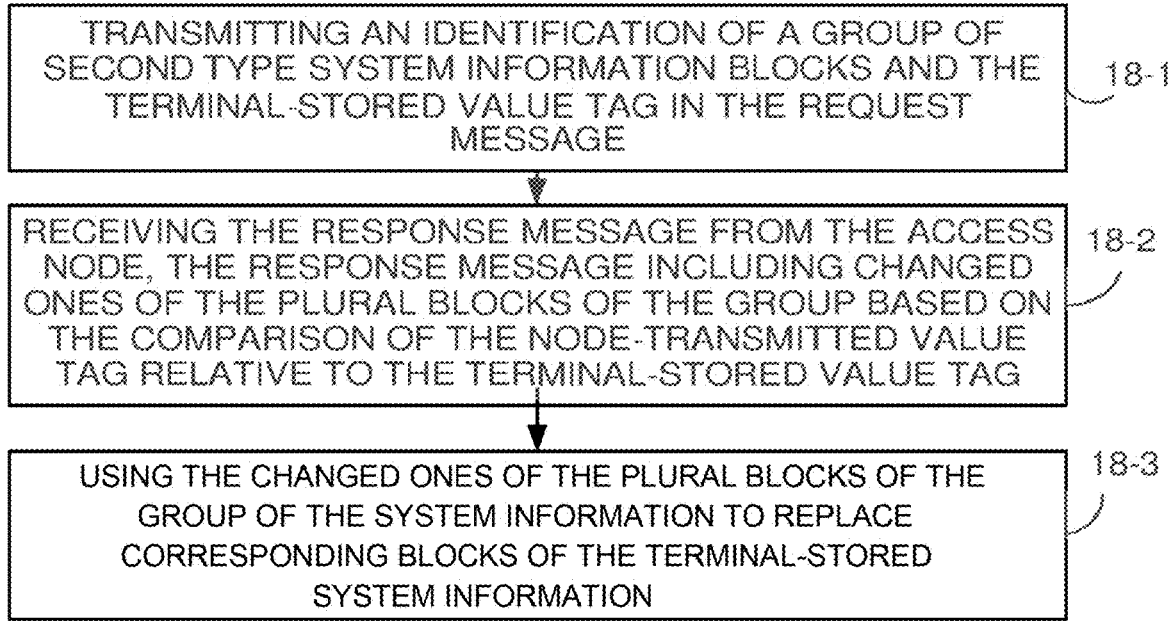
FIG. 18 is a flowchart showing an example, representative, basic acts or steps performed by the wireless terminal of FIG. 14 in implementing certain acts of FIG. 16.

Basic example acts performed by the wireless terminal 26 in conjunction with the example embodiment and mode of FIG. 14 and FIG. 16 are shown in FIG. 18. Act 18-1 comprises transmitting an identification of a group of second type system information blocks and the associated value tag in the request message (e.g., in message 16-4 of FIG. 16). Act 18-2 comprises receiving the response message (e.g., message 16-5 of FIG. 16) from the access node, the response message including changed ones of the plural blocks of the group based on the comparison of the node-transmitted value tag relative to the terminal-stored value tag. Act 18-3 comprises using the changed ones of the plural blocks of the group of the system information to replace corresponding blocks of the terminal-stored system information.

Figure 19:
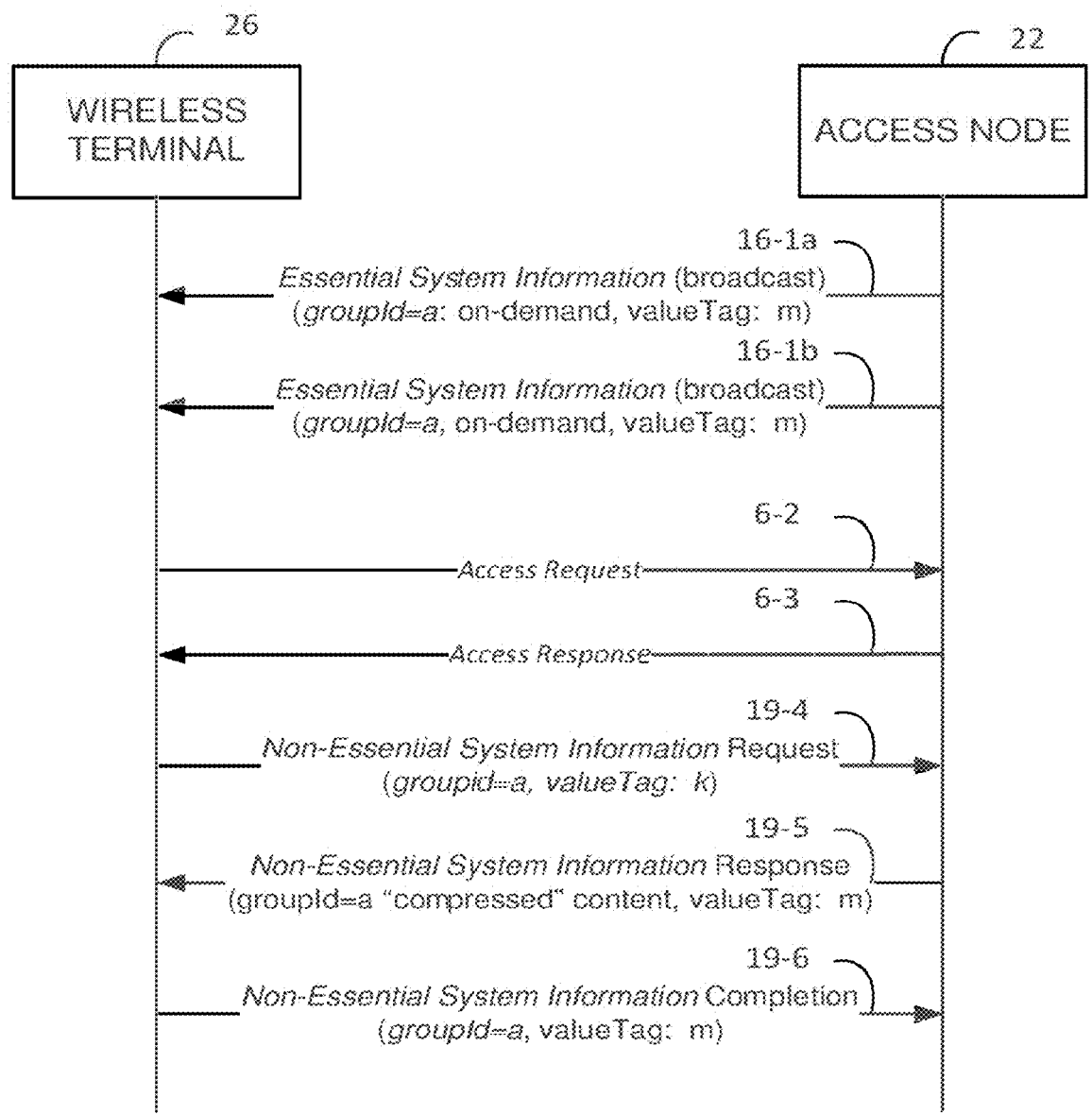
FIG. 19 is a diagrammatic view showing an example message flow for another example embodiment and mode that combines features of the embodiment and mode of FIG. 10 and the embodiment and mode of FIG. 14.

Another example embodiment and mode, having a message flow represented by FIG. 19, is based on the combination of the content compression method disclosed in the embodiment of FIG. 10 and the concept of non-essential SIB group described in the embodiment of FIG. 14. In the message flow of FIG. 19, the wireless terminal 26 sends Non-Essential System Information Request message 19-4 with groupId=a, since the value tag that UE saves for this non-essential SIB group is not current. The Non-Essential System Information Response message 19-5 that the radio access node 22 sends in response contains compressed content of the non-essential SIB group. In one implementation, the compressed content comprises the differences between the current non-essential SIBs (value Tag=m) and the previously broadcasted non-essential SIBs(valueTag=k) under the same non-essential SIB group. The wireless terminal 26 may send to the radio access node 22 a Non-Essential System Information Completion message 19-6.

Figure 20:
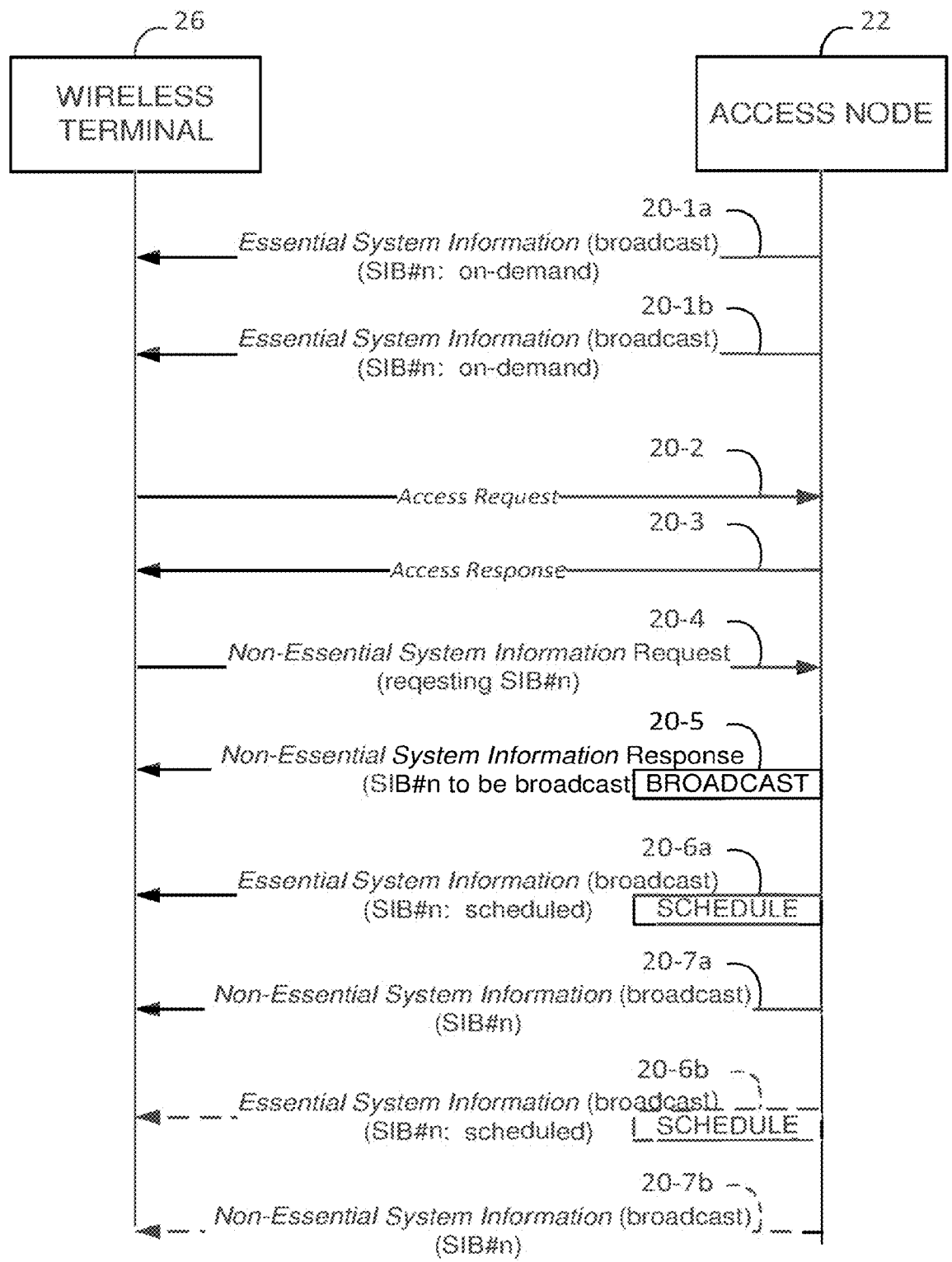
FIG. 20-FIG. 24 are diagrammatic views showing an example message flows for yet other example embodiments and modes.

FIG. 20 illustrates another signaling message flow for another example embodiment and mode. The initial messages (e.g., the Essential System Information messages 20-1a and 20-1b, the Access Request 20-2 and the Access Response 20-3) of FIG. 20 are similar to those of some preceding embodiments and modes, but in FIG. 20 the Non-Essential System Information Response message 20-5 includes an information element indicating that the requested SIB #n will be broadcasted instead of being unicasted. The radio access node 22, at a subsequent cycle of an Essential System Information message transmission (e.g., at the Essential System Information message 20-6a), starts including at least one information element for the schedule of SIB #n transmissions. Based on this schedule information, the radio access node 22 broadcasts the Non-Essential System Information message 20-7a containing the requested SIB #n. As indicated by the messages depicted in broken lines in FIG. 20, the radio access node 22 may repeat these two steps multiple times for reliable delivery (e.g., the Essential System Information message 20-6b and the Non-Essential System Information Message 20-7b). By receiving at least one of these repetitions, the wireless terminal 26 should successfully obtain the SIB #n. The number of repetitions may be determined by the radio access node 22, and information indicating the number may be broadcasted together with the essential system information. Alternatively, the number of repetitions may be determined by the wireless terminal 26 and may be notified to the radio access node 22 through the Non-Essential System Information Request message 20-4.

A benefit of the FIG. 20 embodiment and mode is that the requested SIB #n may also be received by other wireless terminals entering the same coverage area. Such wireless terminals may receive the Essential System Information message 20-6a and know that the SIB #n is scheduled to be transmitted. As a result, the number of transmissions for Non-Essential System Information Request message 20-4 may be reduced. An additional benefit is that the transmissions of messages 20-2 and 20-3 may also be reduced.

Figure 21:
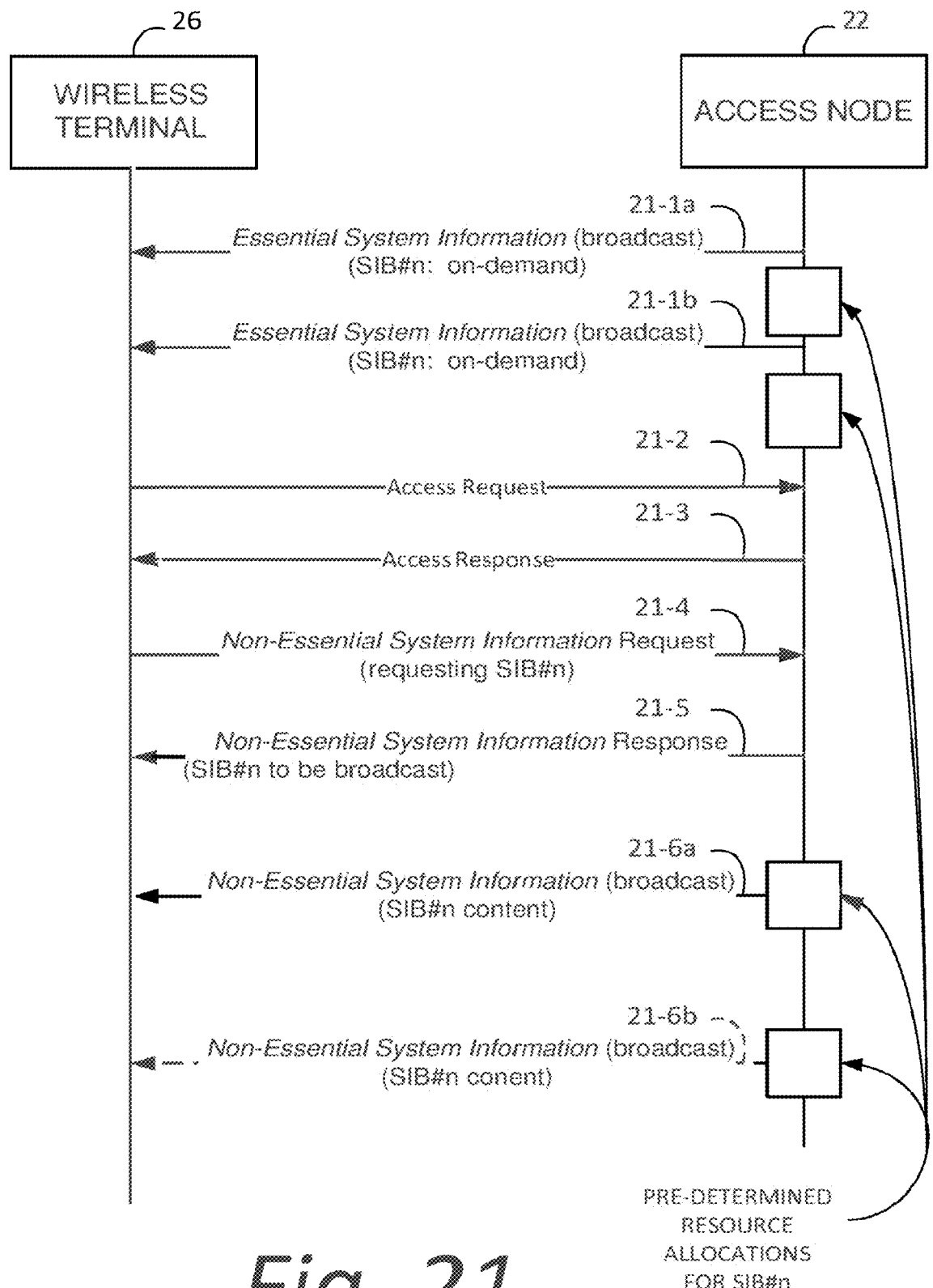

FIG. 21 illustrates yet another signaling message flow for another example embodiment and mode. The initial messages (e.g., the Essential system Information messages 21-1a and 21-1b, the Access Request message 21-2, and the Access Response 21-3) of FIG. 21 are similar to those of some preceding embodiments and modes, but in FIG. 21 the broadcasts of SIB #n in the Non-Essential System Information message(s) occur on pre-determined resource allocations. For example, the pre-determined resource allocations may be defined by using a periodicity and/or an offset. The radio access node 22 may optionally repeat sending Non-Essential System Information message(s) at multiple occasions (e.g., the Non-Essential System Information messages 21-6a and 21-6b). The wireless terminal 26 that has sent a Non-Essential System Information Request message 21-4, requesting the SIB #n, may receive Non-Essential System Information on at least one pre-determined radio resource allocation, without receiving an Essential System Information message. The wireless terminal 26 may also receive the Non-Essential Information Response 21-5 from the access node 22. The radio access node 22 may use these allocated resources for other purposes if it does not transmit SIB #n.

In the embodiment and mode of FIG. 21, any other wireless terminals entering the coverage first receives the Essential System Information message 21-1a, then it may monitor pre-determined resources for several times before sending Non-Essential System Information Request message 21-4, in order to suppress unnecessary transmissions of Non-Essential System Information Request message. The number of monitoring trials may be pre-determined, or may be configured by the Essential System Information message.

In addition, in the embodiment and mode of FIG. 21, the pre-determined resource allocations can be configurable by including the information of allocations in Essential System Information messages 21-1a and 21-1b. The pre-determined resource allocations of a given non-essential SIB may be jointly coded with whether the non-essential SIB is available at this radio access node by request. Alternatively, the pre-determined resource allocations may be tied to the SIB indices.

Figure 22:
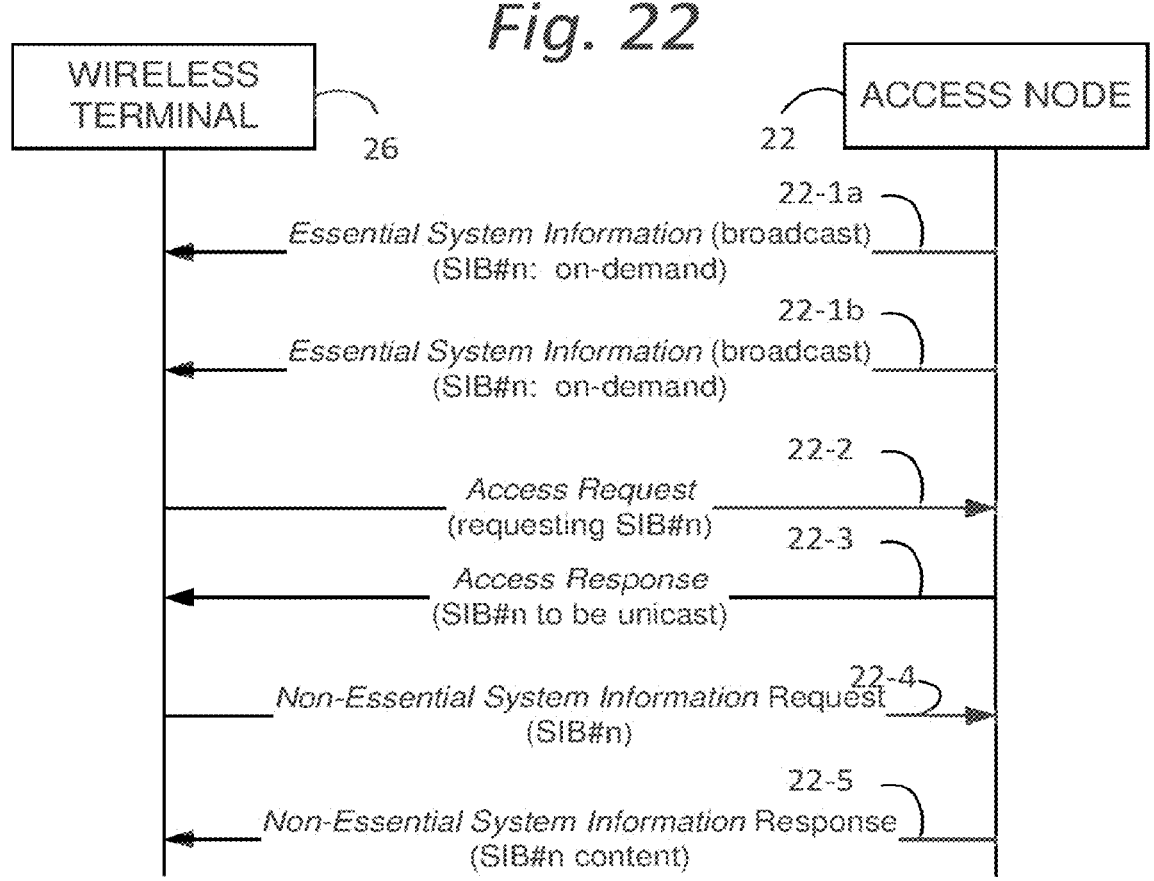
Figure 23:
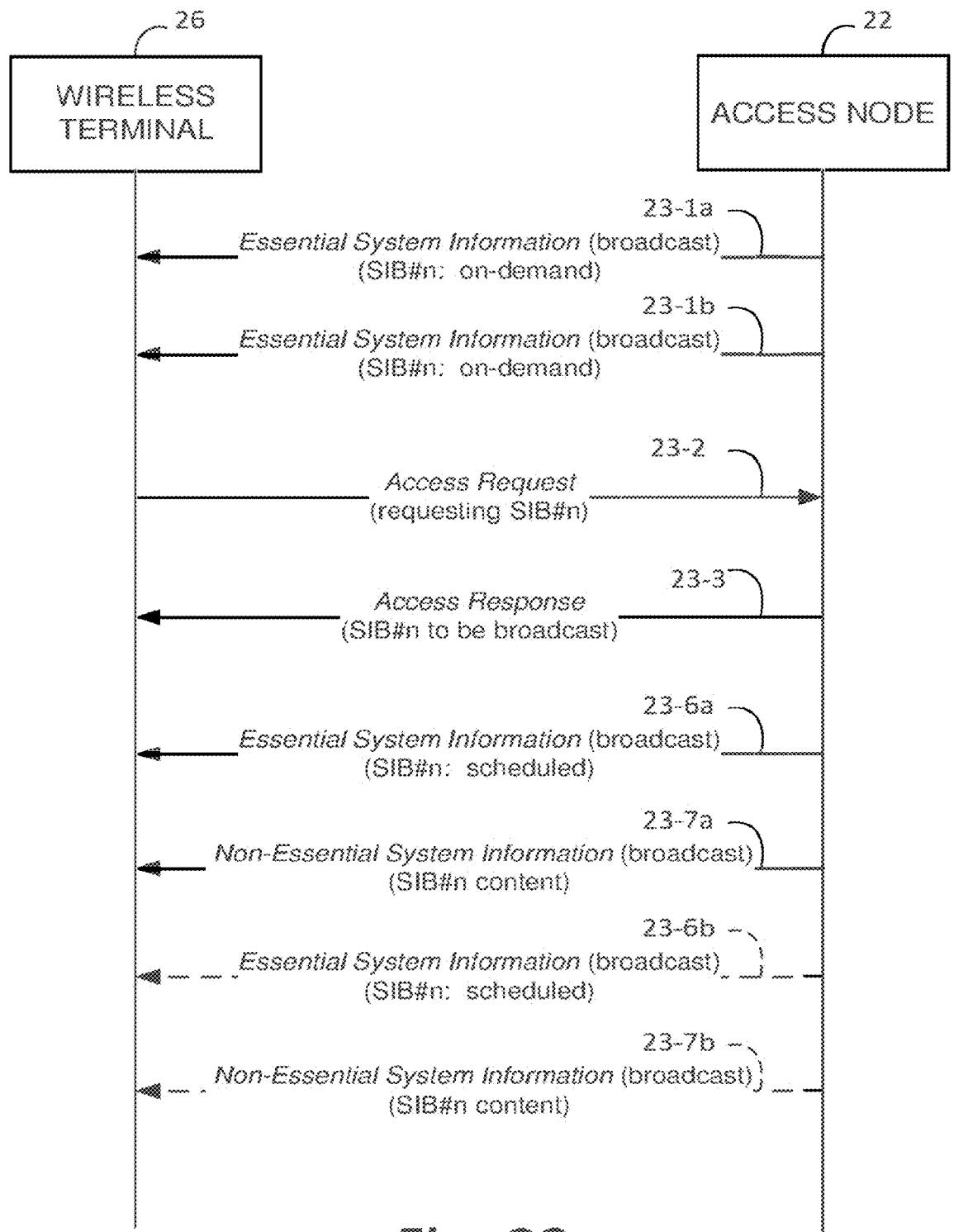
Figure 24:
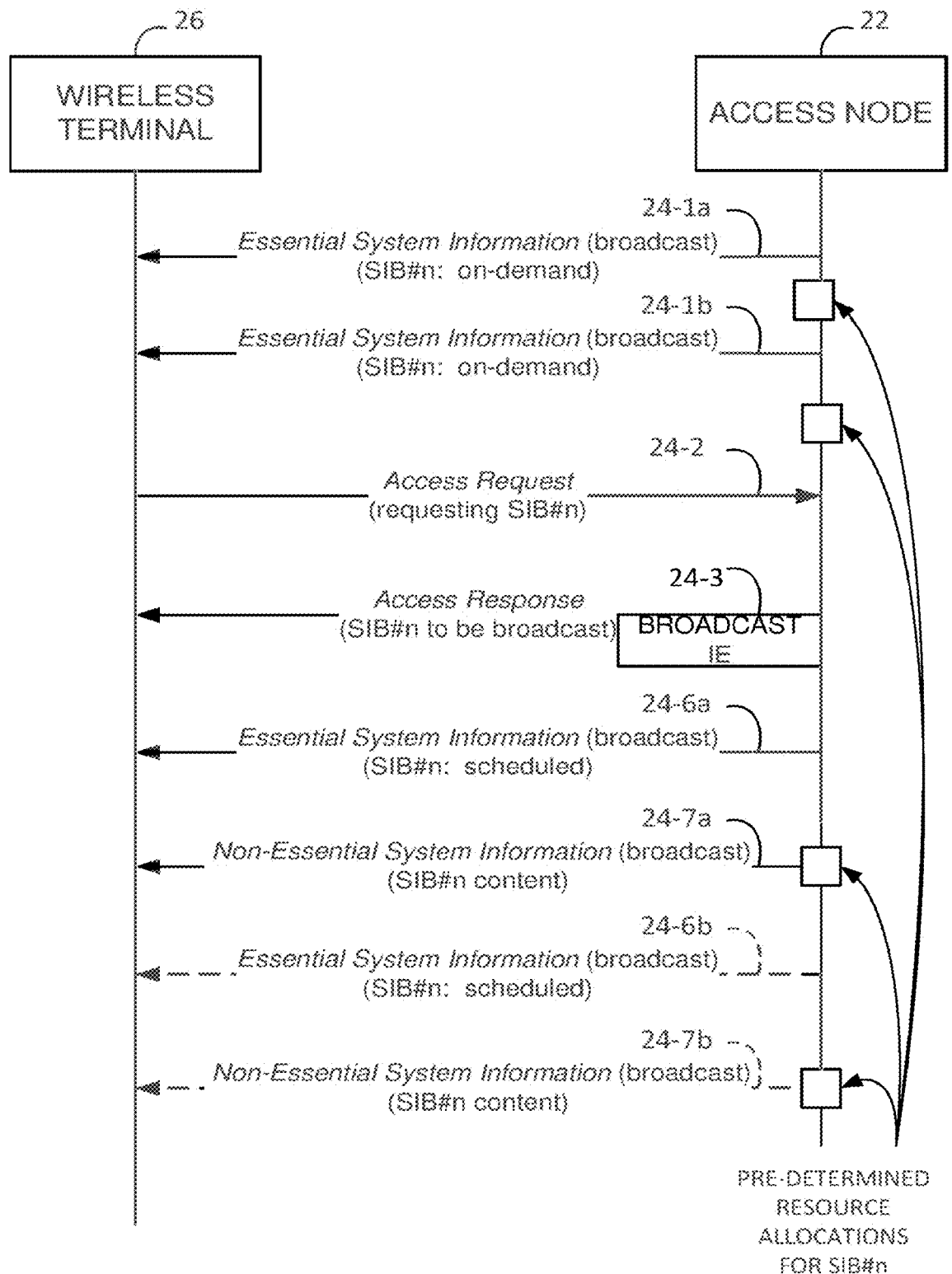

FIG. 22 illustrates yet another signaling message flow for another example embodiment and mode. In FIG. 22, the wireless terminal 26 receives the Essential System Information message(s) (e.g., the Essential Systems Information messages 22-1a and 22-1b) from the radio access node 22. The Access Request message(s) 22-2 contain(s) a request for the SIB #n broadcast. The radio access node that receives the request may decide to deliver the SIB #n by unicast, or by broadcast. In case of unicast, it includes an information element of unicast indication for SIB #n in the Access Response message 22-3, as shown in FIG. 22. Additionally, the wireless terminal 26 may transmit a Non-Essential System Information Request message 22-4 to the radio access node 22 and receive a Non-Essential System Information Response 22-5 from the radio access node 22. In another example, the radio access node 22 includes an information element of a broadcast indication for SIB #n in Access Response message 23-3, as shown in FIG. 23. Additionally, in FIG. 23, the wireless terminal may receive the Essential System Information message(s) (e.g., the Essential System Information messages 23-1a and 23-1b) from the radio access node 22 and transmit an Access Request message 23-2 to the radio access node 22. The wireless terminal 26 may receive an Access Reponse message 23-3 from the radio access node 22. The wireless terminal 26 may further receiver Essential System Information message(s) (e.g., the Essential System information messages 23-6a and 23-6b) and Non-Essential System information message(s) (e.g., the Non-Essential System information messages 23-7a and 23-7b) from the radio access node 22. An alternative approach to FIG. 23 is shown in FIG. 24, where Non-Essential System Information message(s) (e.g., the Non-Essential System Information messages 24-7a and 24-7b) is broadcasted on pre-determined resource allocations. Additionally, in FIG. 24, the wireless terminal 26 may receive the Essential System Information message(s) (e.g., the Essential System Information messages 24-1a and 24-1b) from the radio access node 22 and transmit an Access Request message 24-2 to the radio access node 22. The wireless terminal 26 may receive an Access Reponse message 24-3 from the radio access node 22. The wireless terminal 26 may further receive Essential System Information message(s) (e.g., the Essential System information messages 24-6a and 24-6b) and Non-Essential System information message(s) e.g., the Non-essential information messages 24-7a and 24-7b) from the radio access node 22.

Further information regarding the technology disclosed herein, including but not limited to the example embodiments and modes of FIG. 20-FIG. 24, is provided in related U.S. Provisional Application 62/367,447, entitled "ON-DEMAND SYSTEM INFORMATION FOR WIRELESS TELECOMMUNICATIONS," filed on Jul. 27, 2016.

Figure 25:
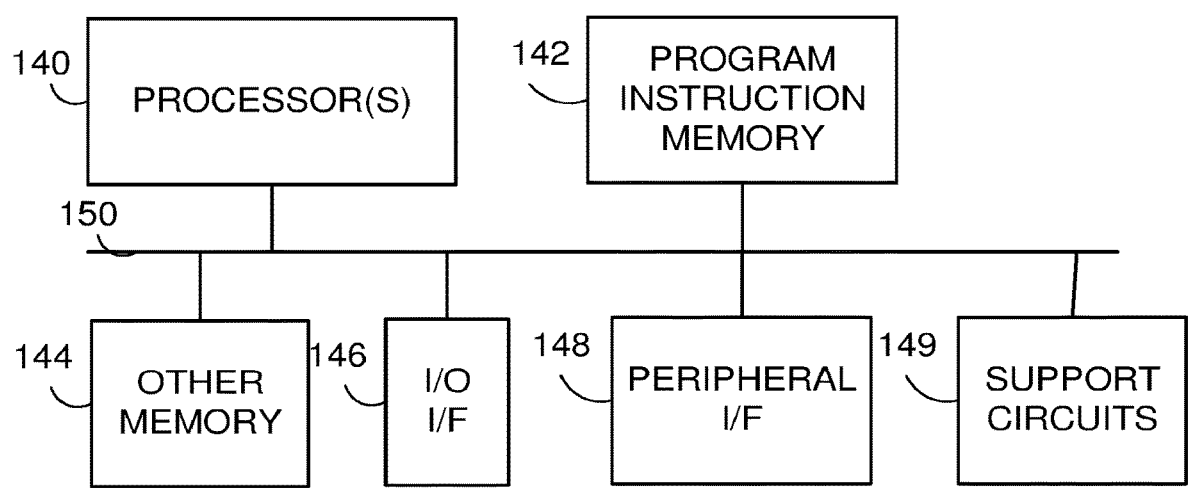
FIG. 25 is a diagrammatic view showing example electronic machinery that may comprise node electronic machinery or terminal electronic machinery.

Certain units and functionalities of the radio access node 22 and wireless terminal 26 are, in example embodiments, implemented by electronic machinery, computer, and/or circuitry. For example, the node processors 30 and terminal processors 40 of the example embodiments herein described and/or encompassed may be comprised by the computer circuitry of FIG. 25. FIG. 25 shows an example of such electronic machinery or circuitry, whether node or terminal, as comprising one or more processor(s) circuits 140, program instruction memory 142; other memory 144 (e.g., random access memory (RAM), cache, etc.); input/output interfaces 146; peripheral interfaces 148; support circuits 149; and busses 150 for communication between the aforementioned units.

The program instruction memory 142 may comprise coded instructions which, when executed by the processor(s), perform acts including but not limited to those described herein. Thus, it is understood that each of node processor 30 and terminal processor 40, for example, comprise memory in which non-transient instructions are stored for execution.

The memory 144, or computer-readable medium, may be one or more of readily available memory such as RAM, read only memory (ROM), floppy disk, hard disk, flash memory or any other form of digital storage, local or remote, and is preferable of non-volatile nature. The support circuits 149 are coupled to the processors 140 for supporting the processor in a conventional manner. These circuits include cache, power supplies, clock circuits, input/output circuitry and subsystems, and the like.

The technology of this application thus encompasses but is not limited to the following example embodiments, example features, and example advantages:

Example Embodiment 1

A user equipment (UE) for receiving system information, comprising:
a processor;
a memory in electronic communication with the processor, wherein instructions stored in the memory are executable to:
receive first system information periodically broadcasted from eNB;
determine types of second system information to additionally receive, wherein each of said types corresponds to a second system information block;
transmit to the eNB a request containing said types of the second system information; and,
receive the requested second system information from the eNB;

Example Embodiment 2

The UE of Example Embodiment 1, wherein contents of one or plurality of second system information blocks are associated with a value tag.

Example Embodiment 3

The UE of Example Embodiment 2, wherein said value tag is assigned and used separately from one or more value tags used for the first system information.

Example Embodiment 4

The UE of Example Embodiment 2, wherein said value tag is valid within one eNB.

Example Embodiment 5

The UE of Example Embodiment 2, wherein said value tag is valid within at least one geographical area consisting of a plurality of eNBs.

Example Embodiment 6

The UE of Example Embodiment 2, wherein said value tag is valid within a pre-determined or network-configured time period from the time wherein the UE receives the associated second system information blocks.

Example Embodiment 7

The UE of Example Embodiment 2, wherein from said first system information the UE obtains value tags, each of which indicates the current version of the corresponding second system information blocks.

Example Embodiment 8

The UE of Example Embodiment 7, wherein the second system information blocks associated with a same value tag are identified by a group index.

Example Embodiment 9

The UE of Example Embodiment 8, wherein said group index is used in said request containing said types of the second system information.

Example Embodiment 10

The UE of Example Embodiment 7, wherein the UE saves in its memory the received second system information blocks and their associated value tags.

Example Embodiment 11

The UE of Example Embodiment 10, wherein the UE determines whether the UE transmits to the eNB a request for delivery of one or a plurality of second system information blocks by comparing each of the current value tags included in said first system information and, if present, the saved value tag corresponding the same second system information blocks.

Example Embodiment 12

The UE of Example Embodiment 11, wherein the UE refrains from requesting delivery of second system information blocks if the current value tag for these second system information blocks matches the saved value tag for the same second system information blocks.

Example Embodiment 13

The UE of Example Embodiment 10, wherein the UE includes the saved value tags in said request.

Example Embodiment 14

The UE of Example Embodiment 13, wherein the UE receives from the eNB one or a plurality of compressed contents, each of which is a compressed image of one or a plurality of second system information blocks.

Example Embodiment 15

The UE of Example Embodiment 14, wherein each of said compressed contents is produced based on two versions of the same types of second system information with different value tags.

Example Embodiment 16

The UE of Example Embodiment 15, wherein each of said compressed contents consists of differences between said two versions.

Example Embodiment 17

The UE of Example Embodiment 14, wherein the UE constructs one or a plurality of second system information blocks using the compressed contents and the saved second system information blocks.

Example Embodiment 18

The UE of Example Embodiment 10, wherein upon receiving a second system information block the UE updates the corresponding value tag saved in the memory.

Example Embodiment 19

An evolved node B (eNB) for delivering system information, comprising:
a processor;
a memory in electronic communication with the processor, wherein instructions stored in the memory are executable to:
periodically broadcast first system information that includes types of second system information available by request, wherein each of said types corresponds to a second system information block;
receive from a UE a request for transmission of said second system information; and,
transmit said requested second system information.

Example Embodiment 20

The eNB of Example Embodiment 19, wherein contents of one or a plurality of second system information blocks are associated with a value tag.

Example Embodiment 21

The eNB of Example Embodiment 20, wherein said value tag is assigned and used separately from one or more value tags used for the first system information.

Example Embodiment 22

The eNB of Example Embodiment 20, wherein said value tag is valid within one eNB.

Example Embodiment 23

The eNB of Example Embodiment 20, wherein said value tag is valid within a geographical area consisting of a plurality of eNBs.

Example Embodiment 24

The eNB of Example Embodiment 20, wherein said value tag is valid within a pre-determined or network-configured time period from the time wherein the UE receives the associated second system information blocks.

Example Embodiment 25

The eNB of Example Embodiment 20, wherein the eNB includes in said first system information value tags, each of which indicates the current version of the corresponding second system information blocks.

Example Embodiment 26

The eNB of Example Embodiment 25, wherein the second system information blocks associated with a same value tag are identified by a group index.

Example Embodiment 27

The eNB of Example Embodiment 20, wherein the eNB generates one or a plurality of compressed contents for second system information upon receiving said request from the UE.

Example Embodiment 28

The eNB of Example Embodiment 27, wherein the eNB receives in said request at least one identification identifying at least one second system information block to deliver to the UE.

Example Embodiment 29

The eNB of Example Embodiment 28, wherein the identification is a value tag.

Example Embodiment 30

The eNB of Example Embodiment 28, wherein the identification is a group index.

Example Embodiment 31

The eNB of Example Embodiment 27, wherein each compressed content is produced based on the version of the second system information block(s) associated with the received identification and the current version of the same second system information block(s).

Example Embodiment 32

The eNB of Example Embodiment 31, wherein each of said compressed content consists of differences between said two versions.

Example Embodiment 33

A method for a user equipment (UE) comprising:
receiving first system information periodically broadcasted from eNB;
determining types of second system information to additionally receive;
transmitting to the eNB a request containing said types of the second system information, wherein each of said types corresponds to a second system information block; and,
receiving the requested second system information from the eNB.

Example Embodiment 34

A method for an evolved node B (eNB) comprising:
periodically broadcasting first system information that includes types of second system information available by request;
receiving from a UE a request for transmission of said second system information, wherein each of said types corresponds to a second system information block; and,
transmitting said requested second system information.

Example Embodiment 35

In one of its example aspects, the technology disclosed herein concerns an access node of a radio access network. The access node comprises processor circuitry and a transmitter. The processor circuitry is configured to generate a value tag associated with system information. The system information facilitates the use of communication services provided by the access node. The transmitter is configured to transmit, over a radio interface, node-available system information comprising an identification of the system information and the value tag associated with the system information.

Example Embodiment 36

The node of Example Embodiment 35, wherein the processor circuitry is configured: to schedule periodic transmissions by the transmitter of first type system information over the radio interface; separately from the periodic transmissions of the first type system information, to schedule transmission by the transmitter of second type system information over the radio interface. The value tag is associated with the second type system information.

Example Embodiment 37

The node of Example Embodiment 36, wherein the first type system information is periodically broadcasted by the transmitter and is required for initial access to the radio access network, and the second type system information is not required for initial access to the radio access network.

Example Embodiment 38

The node of Example Embodiment 35, wherein the processor circuitry is configured to schedule periodic transmissions by the transmitter of first type system information over the radio interface, the period transmissions also including the node-available system information for second type system information, the value tag being associated with the second type system information.

Example Embodiment 39

The node of Example Embodiment 38, wherein the processor circuitry is further configured to schedule a transmission by the transmitter over the radio interface of the second type system information separately from the periodic transmissions of the first type system information.

Example Embodiment 40

The node of Example Embodiment 38, wherein the processor circuitry is configured to change the value tag when a parameter of the second type system information is changed.

Example Embodiment 41

The node of Example Embodiment 40, wherein the processor circuitry is configured to increment a number of the value tag when a parameter of the second type system information is changed.

Example Embodiment 42

The node of Example Embodiment 38, wherein the processor circuitry is configured to generate the value tag to be valid in a cell served by the access node.

Example Embodiment 43

The node of Example Embodiment 38, wherein the processor circuitry is configured to generate the value tag to be valid in a geographical area served by the access node and a group of at least one other access node.

Example Embodiment 44

The node of Example Embodiment 43, wherein the processor circuitry is configured to generate a signal to define the group of other access nodes.

Example Embodiment 45

The node of Example Embodiment 35, wherein the access node further comprises a receiver configured to receive a request message from a wireless terminal when the wireless terminal requests the second type system information; and the processor circuitry is configured to include requested second type system information in a response message to the wireless terminal.

Example Embodiment 46

The node of Example Embodiment 45, wherein the processor circuitry is configured to include the value tag in the response message to the wireless terminal.

Example Embodiment 47

The node of Example Embodiment 45, wherein the second type system information comprises plural parameters, the receiver is configured to receive a wireless terminal-reported value tag in the request message, and the processor circuitry is configured: to change the value tag when at least one of the plural parameters of the second type system information changes and to store a parameter identifier for the at least one of the plural parameters for which content changes; to make a comparison of the wireless terminal-reported value tag with the value tag, and, to prepare the response message to include only changed ones of the plural parameters based on the comparison of the value tag relative to the wireless terminal-reported value tag.

Example Embodiment 48

The node of Example Embodiment 38, wherein the processor circuitry is configured to generate the value tag to be associated with a group of plural second type system information blocks.

Example Embodiment 49

The node of Example Embodiment 48, wherein the receiver is configured to receive a wireless terminal-reported value tag in the request message, and the processor circuitry is configured: to change the value tag when content changes for at least one block of the group and to store a block identifier for the at least one block for which content changes; to make a comparison of the wireless terminal-reported value tag with the value tag, and, to prepare the response message to include only changed ones of the plural blocks of the group based on the comparison of the value tag relative to the wireless terminal-reported value tag.

Example Embodiment 50

The node of Example Embodiment 49, wherein at least one of the blocks of the group of the second type system information comprises plural parameters, and the processor circuitry is further configured to prepare the response message to include only changed ones of the plural parameters of the changed ones of the plural blocks of the group based on a comparison of the changed in the value tag relative to the wireless terminal-reported value tag.

Example Embodiment 51

The node of Example Embodiment 45, wherein the processor circuitry is configured to include in the response message an indication that the requested system information will be broadcast.

Example Embodiment 52

In another of its example aspects, the technology disclosed herein concerns a method in an access node of a radio access network. In a basic implementation the method comprises generating a value tag associated with system information, the system information facilitating the use of communication services provided by the access node; and, transmitting over a radio interface node-available system information comprising an identification of the system information and the value tag associated with the system information.

Example Embodiment 53

The method of Example Embodiment 52, wherein the method further comprises: scheduling periodic transmissions by the transmitter of first type system information over the radio interface; separately from the periodic transmissions of the first type system information, scheduling transmission of second type system information over the radio interface to the at least one wireless terminal; and wherein the value tag is associated with the second type system information.

Example Embodiment 54

The method of Example Embodiment 53, wherein the first type system information is periodically broadcasted by the transmitter and is required for initial access to the radio access network, and the second type system information is not required for initial access to the radio access network.

Example Embodiment 55

The method of Example Embodiment 52, wherein the method further comprises scheduling periodic transmissions of first type system information over the radio interface, the period transmissions also including the node-available system information for second type system information, the value tag being associated with the second type system information.

Example Embodiment 56

The method of Example Embodiment 55, wherein the method further comprises scheduling a transmission over the radio interface of the second type system information separately from the periodic transmissions of the first type system information.

Example Embodiment 57

The method of Example Embodiment 55, wherein the method further comprises changing the value tag when a parameter of the second type system information is changed.

Example Embodiment 58

The method of Example Embodiment 57, wherein the method further comprises incrementing a number of the value tag when a parameter of the second type system information is changed.

Example Embodiment 59

The method of Example Embodiment 52, wherein the method further comprises generating the value tag to be valid in a cell served by the access node.

Example Embodiment 60

The method of Example Embodiment 52, wherein the method further comprises generating the value tag to be valid in a geographical area served by the access node and a group of at least one other access node.

Example Embodiment 61

The method of Example Embodiment 60, wherein the method further comprises generating a signal which defines the group of other access nodes.

Example Embodiment 62

The method of Example Embodiment 52, wherein the method further comprises receiving a request message from a wireless terminal when the wireless terminal requests the second type system information; and including requested second type system information in a response message to the wireless terminal.

Example Embodiment 63

The method of Example Embodiment 62, wherein the method further comprises including the value tag in the response message to the wireless terminal.

Example Embodiment 64

The method of Example Embodiment 62, wherein the second type system information comprises plural parameters, and the method further comprises: receiving a wireless terminal-reported value tag in the request message, changing the value tag when at least one of the plural parameters of the second type system information changes and storing a parameter identifier for the at least one of the plural parameters for which content changes; making a comparison of the wireless terminal-reported value tag with the value tag, and, preparing the response message to include only changed ones of the plural parameters based on the comparison of the value tag relative to the wireless terminal-reported value tag.

Example Embodiment 65

The method of Example Embodiment 55, wherein the method further comprises generating the value tag to be associated with a group of plural second type system information blocks.

Example Embodiment 66

The method of Example Embodiment 65, wherein the method further comprises receiving a wireless terminal-reported value tag in the request message, changing the value tag when content changes for at least one block of the group and storing a block identifier for the at least one block for which content changes; making a comparison of the wireless terminal-reported value tag with the value tag, and, preparing the response message to include only changed ones of the plural blocks of the group based on the comparison of the value tag relative to the wireless terminal-reported value tag.

Example Embodiment 67

The method of Example Embodiment 66, wherein at least one of the blocks of the group of the second type system information comprises plural parameters, and the method further comprises preparing the response message to include only changed ones of the plural parameters of the changed ones of the plural blocks of the group based on a comparison of the changed in the value tag relative to the wireless terminal-reported value tag.

Example Embodiment 68

The method of Example Embodiment 62, wherein the method further comprises including in the response message an indication that the requested system information will be broadcast.

Example Embodiment 69

In another of its aspects, the technology disclosed herein concerns a wireless terminal which communicates over a radio interface with an access node of a radio access network. The wireless terminal basically comprises a receiver and processor circuitry. The receiver is configured to receive from the access node a system information availability message comprising an identification of node-available system information and a node-transmitted value tag associated with the node-available system information. The processor circuitry is configured on the basis of the node-transmitted value tag to determine whether to request that the node-available system information be transmitted to the wireless terminal.

Example Embodiment 70

The wireless terminal of Example Embodiment 69, wherein the processor circuitry is configured to make a determination that terminal-stored system information is current system information if a terminal-stored value tag associated with the terminal-stored system information is the same as the node-transmitted value tag associated with the node-available system information.

Example Embodiment 71

The wireless terminal of Example Embodiment 70, wherein the processor circuitry is configured to make a determination that the terminal-stored system information is the current system information if the terminal-stored system information has been received within a predetermined time from a current time.

Example Embodiment 72

The wireless terminal of Example Embodiment 70, wherein the processor circuitry is configured to make a determination that the terminal-stored system information is the current system information if the terminal-stored system information is received in a validity area of the access node upon which the wireless terminal is camping.

Example Embodiment 73

The wireless terminal of Example Embodiment 69, wherein the processor circuitry is configured to make a comparison of terminal-stored value tag and the node-transmitted value tag and on the basis of the comparison to generate a request message to request that the node-available system information be transmitted to the wireless terminal; and wherein the wireless terminal further comprises a transmitter configured to transmit the request message to the access node.

Example Embodiment 74

The wireless terminal of Example Embodiment 73, wherein the processor circuitry is further configured to use the node-available system information to replace the terminal-stored system information.

Example Embodiment 75

The wireless terminal of Example Embodiment 73, wherein the receiver is configured: to receive periodic transmissions of first type system information over the radio interface; separately from the periodic transmissions of the first type system information, to receive transmission of second type system information over the radio interface; and wherein the node-transmitted value tag is associated with the second type system information.

Example Embodiment 76

The wireless terminal of Example Embodiment 75, wherein the first type system information comprises information which is periodically broadcasted by the transmitter and which is required for initial access to the radio access network, and where in the second type system information is not required for initial access to the radio access network.

Example Embodiment 77

The wireless terminal of Example Embodiment 73, wherein the receiver is configured to receive periodic transmissions of first type system information over the radio interface, the period transmissions also including the node-available system information for second type system information, the value tag being associated with the second type system information.

Example Embodiment 78

The wireless terminal of Example Embodiment 77, wherein the receiver is configured, in response to the request message and separately from the periodic transmissions of the first type system information, to receive a transmission over the radio interface of the second type system information.

Example Embodiment 79

The wireless terminal of Example Embodiment 77, wherein the value tag is valid in a cell served by the access node.

Example Embodiment 80

The wireless terminal of Example Embodiment 77, wherein the value tag is valid in a geographical area served by the access node and a group of at least one other access node.

Example Embodiment 81

The wireless terminal of Example Embodiment 80, wherein the receiver is configured to receive a signal which defines the geographical area.

Example Embodiment 82

The wireless terminal of Example Embodiment 78, wherein the second type system information comprises plural parameters, the transmitter is configured to transmit the terminal-stored value tag in the request message; the receiver is configured to receive the response message from the access node, the response message including changed ones of the plural parameters based on a comparison at the access node of the node-reported value tag relative to the terminal-stored value tag; and the processor circuitry is configured to use the changed ones of the plural parameters of the system information to replace corresponding parameters of the terminal-stored system information.

Example Embodiment 83

The wireless terminal of Example Embodiment 78, wherein the second type system information comprises plural parameters, the transmitter is configured to transmit an identification of a group of second type system information blocks in the request message; the receiver is configured to receive the response message from the access node, the response message including changed ones of the plural blocks of the group based on the comparison of the node-transmitted value tag relative to the terminal-stored value tag; and the processor circuitry is configured to use the changed ones of the plural blocks of the group of the system information to replace corresponding blocks of the terminal-stored system information.

Example Embodiment 84

The wireless terminal of Example Embodiment 83, wherein at least one of the blocks of the group of the second type system information comprises plural parameters, and the response message includes only changed ones of the plural parameters of the changed ones of the plural blocks of the group based on a comparison of the changed in the value tag relative to the terminal-stored value tag; and the processor circuitry is configured to use the changed ones of the plural parameters of the plural blocks of the group of the system information to replace corresponding parameters of corresponding blocks of the terminal-stored system information.

Example Embodiment 85

The wireless terminal of Example Embodiment 78, wherein the receiver is configured to receive in the response message an indication that the requested system information will be broadcast.

Example Embodiment 86

In another of its example aspects, the technology disclosed herein concerns a method in a wireless terminal that communicates over a radio interface with an access node of a radio access network. In a basic mode the method comprises receiving from the access node a system information availability message comprising an identification of node-available system information and a node-transmitted value tag associated with the node-available system information; and, on the basis of the node-transmitted value tag determining whether to request that the node-available system information be transmitted to the wireless terminal.

Example Embodiment 87

The method of Example Embodiment 86, wherein the method further comprises making a determination that terminal-stored system information is current system information if a terminal-stored value tag associated with the terminal-stored system information is the same as the node-transmitted value tag associated with the node-available system information.

Example Embodiment 88

The method of Example Embodiment 87, wherein the method further comprises making a determination that the terminal-stored system information is the current system information if the terminal-stored system information has been received within a predetermined time from a current time.

Example Embodiment 89

The method of Example Embodiment 87, wherein the method further comprises making a determination that the terminal-stored system information is the current system information if the terminal-stored system information is received in a validity area of the access node upon which the wireless terminal is camping.

Example Embodiment 90

The method of Example Embodiment 86, wherein the method further comprises making a comparison of terminal-stored value tag and the node-transmitted value tag; on the basis of the comparison to generate a request message to request that the node-available system information be transmitted to the wireless terminal; and transmitting the request message to the access node.

Example Embodiment 91

The method of Example Embodiment 90, wherein the method further comprises using the node-available system information to replace the terminal-stored system information.

Example Embodiment 92

The method of Example Embodiment 90, wherein the method further comprises receiving periodic transmissions of first type system information over the radio interface; separately from the periodic transmissions of the first type system information, receiving second type system information over the radio interface; and wherein the node-transmitted value tag is associated with the second type system information.

Example Embodiment 93

The method of Example Embodiment 92, wherein the first type system information comprises information which is periodically broadcasted by the transmitter and which is required for initial access to the radio access network, and wherein the second type system information is not required for initial access to the radio access network.

Example Embodiment 94

The method of Example Embodiment 90, wherein the method further comprises receiving periodic transmissions of first type system information over the radio interface, the period transmissions also including the node-available system information for second type system information, the value tag being associated with the second type system information.

Example Embodiment 95

The method of Example Embodiment 94, wherein the method further comprises receiving a transmission over the radio interface of the second type system information in a response message which is in response to the request message and separately from the periodic transmissions of the first type system information.

Example Embodiment 96

The method of Example Embodiment 94, wherein the value tag is valid in a cell served by the access node.

Example Embodiment 97

The method of Example Embodiment 94, wherein the value tag is valid in a geographical area served by the access node and a group of at least one other access node.

Example Embodiment 98

The method of Example Embodiment 97, wherein the method further comprises receiving a signal which defines the geographical area.

Example Embodiment 99

The method of Example Embodiment 95, wherein the second type system information comprises plural parameters, and the method further comprises: transmitting the terminal-stored value tag in the request message; receiving the response message from the access node, the response message including changed ones of the plural parameters based on a comparison at the access node of the node-reported value tag relative to the terminal-stored value tag; and using the changed ones of the plural parameters of the system information to replace corresponding parameters of the terminal-stored system information.

Example Embodiment 100

The method of Example Embodiment 95, wherein the second type system information comprises plural parameters, and the method further comprises: transmitting an identification of a group of second type system information blocks in the request message; receiving the response message from the access node, the response message including changed ones of the plural blocks of the group based on the comparison of the node-transmitted value tag relative to the terminal-stored value tag; and using the changed ones of the plural blocks of the group of the system information to replace corresponding blocks of the terminal-stored system information.

Example Embodiment 101

The method of Example Embodiment 100, wherein at least one of the blocks of the group of the second type system information comprises plural parameters, and the response message includes only changed ones of the plural parameters of the changed ones of the plural blocks of the group based on a comparison of the changed in the value tag relative to the terminal-stored value tag; and the method further comprises using the changed ones of the plural parameters of the plural blocks of the group of the system information to replace corresponding parameters of corresponding blocks of the terminal-stored system information.

Example Embodiment 102

The method of Example Embodiment 95, wherein the method further comprises receiving in the response message an indication that the requested system information will be broadcast.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other types of hardware implementation, or a combination of software and hardware. The software routines of the disclosed embodiments are capable of being executed on any computer operating systems, and is capable of being performed using any central processing unit(s) (CPU(s)) architecture. The instructions of such software are stored on non-transient computer readable media.

The functions of the various elements including functional blocks, including but not limited to those labeled or described as "computer," "processor" or "controller," may be provided through the use of hardware such as circuit hardware and/or hardware capable of executing software in the form of coded instructions stored on computer readable mediums. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, the use of the term "processor" or "controller" shall also be construed to refer to other hardware capable of performing such functions and/or executing software, such as the example hardware recited above.

The functions of the various elements including functional blocks, including but not limited to those labeled or described as "computer," "processor" or "controller," may be provided through the use of hardware such as circuit hardware and/or hardware capable of executing software in the form of coded instructions stored on computer readable mediums. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

Although the description above contains many specificities, these should not be construed as limiting the scope of the technology disclosed herein but as merely providing illustrations of some of the presently preferred embodiments of the technology disclosed herein. Thus, the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A user equipment (UE) comprising:
processing circuitry configured to store a second type system information block, the second type system information block being associated with a first value tag, the second type system information block being area specific or cell specific, an area specific second type system information block being valid within an area, a cell specific second type system information block being valid within a cell, and;
receiving circuitry configured to receive, from a base station apparatus, a first type system information block comprising an indication and a second value tag associated with the second type system information block, the indication indicating whether the second type system information block is provided on-demand,
wherein:
the processing circuitry is configured to initiate a reception procedure to obtain the second type system information block, based on whether the stored second type system information block is area specific or cell specific, the first value tag and the second value tag;
the reception procedure comprises transmission of a request message for the second type information block based on the indication; and
the first type system information block is used for receiving minimum system information, the minimum system information comprising, at least, information required for an initial access.

2. The UE according to claim 1, wherein for the stored second type system information blocks, validity is determined based on the first value tag and the second value tag.

3. The UE according to claim 2, wherein the second type system information blocks comprises other system information not included in the minimum system information.

4. The UE according to claim 3, further comprising transmitting circuitry configured to transmit the request message to the base station apparatus.

5. A base station apparatus comprising:
processor circuitry configured to generate a value tag associated with a second type system information block, the second type system information block being associated with a first value tag, the second type system information block being area specific or cell specific, an area specific second type system information block being valid within an area, a cell specific second type system information block being valid within a cell; and
transmitting circuitry configured to transmit, to a user equipment (UE), a first type system information block and the second type system information block, the first type system information block comprising the value tag and an indication, the indication indicating whether the second type system information block is provided on-demand,
wherein;
the value tag associated with the second type system information blocks and whether the second type system information blocks is area specific or cell specific are used by the UE to initiate a reception procedure to obtain the second type system information block;
the reception procedure comprises transmission of a request message for the second type information block based on the indication; and
the first type system information block is used for transmitting minimum system information, the minimum system information comprising, at least, information required for an initial access.

6. The base station apparatus according to claim 5, wherein the second type system information block comprises other system information not included in the minimum system information.

7. The base station apparatus according to claim 6, further comprising receiving circuitry configured to receive the request message from the UE.

8. A communication method of a user equipment (UE) comprising:
- storing a second type system information block, the second type system information block being associated with a first value tag, the second type system information block being area specific or cell specific, an area specific second type system information block being valid within an area, a cell specific second type system information block being valid within a cell;
- receiving, from a base station apparatus, a first type system information block comprising an indication and a second value tag associated with the second type system information block, the indication indicating whether the second type system information block is provided on-demand; and
- initiating a reception procedure to obtain the second type system information block, based on whether the stored second type system information block is area specific or cell specific, the first value tag and the second value tag, wherein:
- the reception procedure comprises transmission of a request message for the second type information block based on the indication; and
- the first type system information block is used for receiving minimum system information, the minimum system information comprising, at least, information required for an initial access.

9. The communication method according to claim 8, wherein for the stored second type system information block, validity is determined based on the first value tag and the second value tag.

10. The communication method according to claim 9, wherein the second type system information block comprises other system information not included in the minimum system information.

11. The communication method according to claim 10, further comprising transmitting the request message to the base station apparatus.

12. A communication method of a base station apparatus comprising:
- generating a value tag associated with a second type system information block, the second type system information block being area specific or cell specific, an area specific second type system information block being valid within an area, a cell specific second tpe system information block being valid within a cell; and
- transmitting, to a user equipment (UE), a first type system information block and the second type system information block, the first type system information block comprising the value tag and an indication, the indication indicating whether the second type system information is provided on-demand, wherein:
- the value tag associated with the second type system information block and whether the second type system information block is area specific or cell specific are used by the UE to initiate a reception procedure to obtain the second type system information block;
- the reception procedure comprises transmission of a request message for the second type information block based on the indication; and
- the first type system information block is used for transmitting minimum system information, the minimum system information comprising, at least, information required for an initial access.

13. The communication method according to claim 12, wherein the second type system information block comprises other system information not included in the minimum system information.

14. The communication method according to claim 13, further comprising receiving the request message from the UE.

* * * * *